(12) United States Patent
Mizobata et al.

(10) Patent No.: US 11,273,759 B2
(45) Date of Patent: Mar. 15, 2022

(54) VEHICLE CABIN LIGHTING SYSTEM

(71) Applicant: TOYOTA JIDOSHA KABUSHIKI KAISHA, Aichi-ken (JP)

(72) Inventors: Hiroshi Mizobata, Seto (JP); Kazuma Uchibori, Kasugai (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/148,581

(22) Filed: Jan. 14, 2021

(65) Prior Publication Data

US 2021/0245658 A1     Aug. 12, 2021

(30) Foreign Application Priority Data

Feb. 7, 2020 (JP) .............................. JP2020-020146

(51) Int. Cl.
*B60Q 3/80* (2017.01)
*B60Q 3/74* (2017.01)
*H05B 47/115* (2020.01)
*G06K 9/00* (2006.01)

(52) U.S. Cl.
CPC ............. *B60Q 3/80* (2017.02); *B60Q 3/74* (2017.02); *G06K 9/00832* (2013.01); *H05B 47/115* (2020.01); *G06K 9/00369* (2013.01); *G06K 9/00845* (2013.01)

(58) Field of Classification Search
CPC ........ B60Q 3/217; B60Q 3/233; B60Q 3/267; B60Q 3/51; B60Q 3/74–80; B60Q 9/00; G06K 9/00; G06K 9/00369; G06K 9/00832–00845; H05B 47/115; H05B 47/16

See application file for complete search history.

(56) References Cited

U.S. PATENT DOCUMENTS

| | | | |
|---|---|---|---|
| 2016/0152178 A1 | 6/2016 | Peterson et al. | |
| 2018/0224932 A1 | 8/2018 | Von Novak et al. | |
| 2020/0223328 A1 | 7/2020 | Kobayashi et al. | |

FOREIGN PATENT DOCUMENTS

| JP | 201697780 A | 5/2016 |
|---|---|---|
| JP | 2016137202 A | 8/2016 |
| JP | 201836109 A | 3/2018 |
| JP | 20196146 A | 1/2019 |
| JP | 2020111292 A | 7/2020 |

*Primary Examiner* — Jason M Han
(74) *Attorney, Agent, or Firm* — Hauptman Ham, LLP

(57) ABSTRACT

A vehicle cabin lighting system includes: a lighting device that is provided inside a vehicle cabin and that is configured to move a position of light; and a control section that is configured to determine whether or not an occupant sitting on a vehicle seat has an interest in interacting with another occupant inside the vehicle cabin based on operation of an operation section by the occupant or based on a state of the occupant sitting on the vehicle seat, and to control the lighting device so as to move the position of the light in order to direct a gaze direction of the occupant toward a vehicle width direction outer side in a case in which no interest in interacting has been determined.

12 Claims, 17 Drawing Sheets

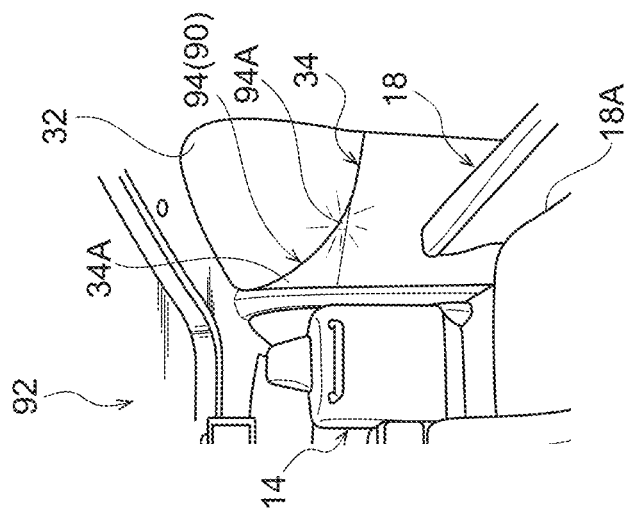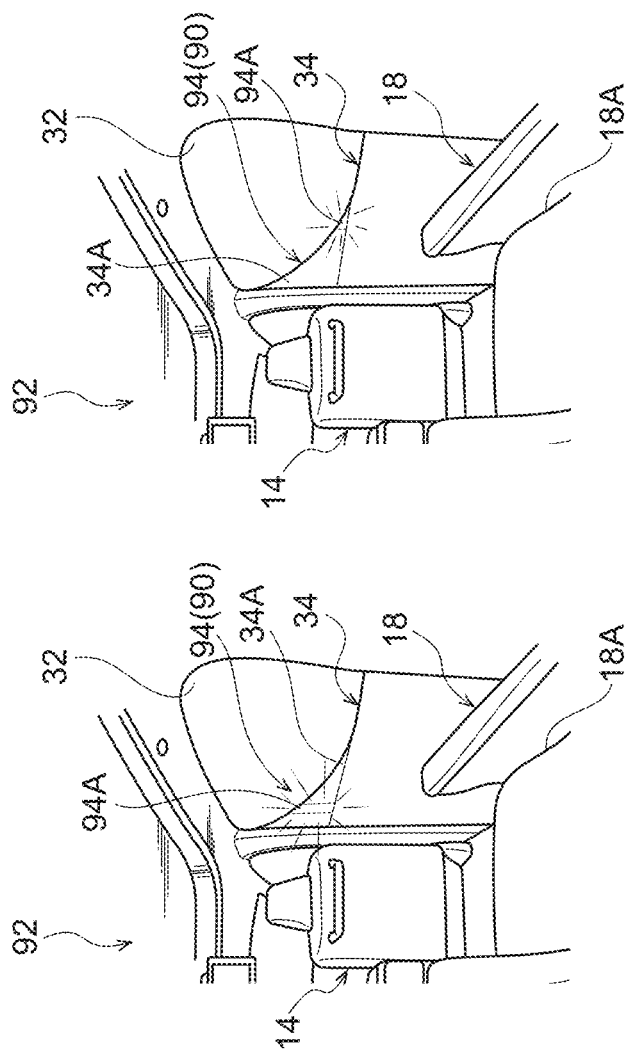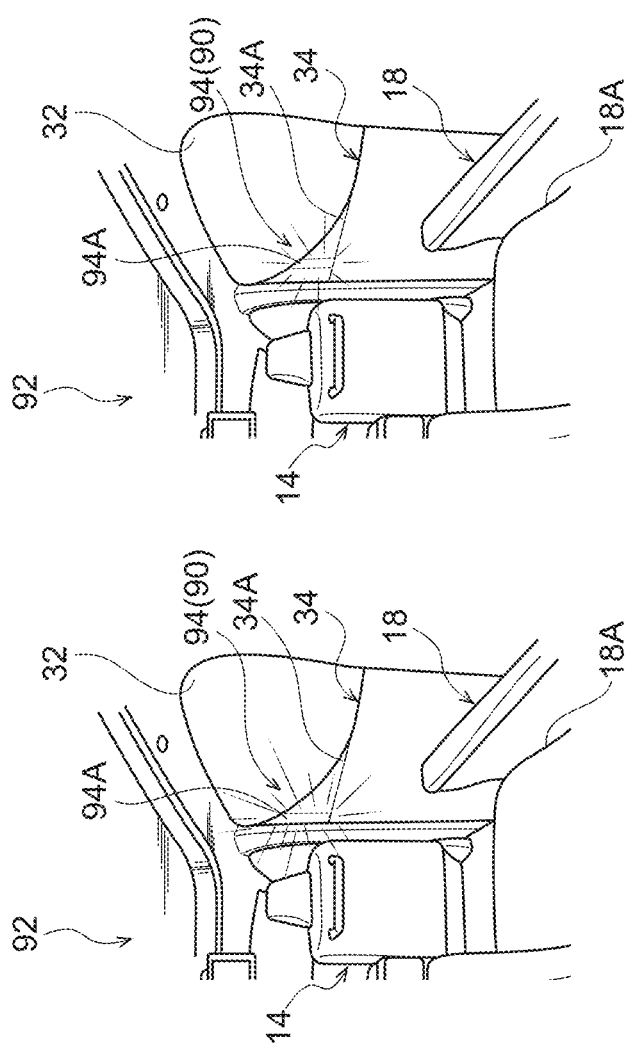

VEHICLE CABIN LIGHTING SYSTEM

CROSS-REFERENCE TO RELATED APPLICATION

This application is based on and claims priority under 35 USC 119 from Japanese Patent Application No. 2020-020146 filed on Feb. 7, 2020, the disclosure of which is incorporated by reference herein.

BACKGROUND

Technical Field

The present disclosure relates to a vehicle cabin lighting system.

Related Art

Japanese Patent Application Laid-Open (JP-A) No. 2016-97780 discloses a rotary seat device for a vehicle, in which adjacent seats in a vehicle are coupled together so as to be capable of rotating in directions toward or away from each other. In this vehicle rotary seat device, the seats are rotated to desired angles by seat occupants using a seat rotation mechanism in order to allow the occupants to pass the time in a pleasant environment.

However, in the rotary seat device of JP-A No. 2016-97780, it is necessary to provide a seat rotation mechanism to each seat to be rotated. There is therefore room for improvement from the perspective of suppressing increases in cost and weight.

SUMMARY

The present disclosure provides a vehicle cabin lighting system that may allow occupants to pass the time in greater comfort, while suppressing increases in cost and weight.

A first aspect of the present disclosure is a vehicle cabin lighting system including: a lighting device that is provided inside a vehicle cabin and that is configured to move a position of light; and a control section that is configured to determine whether or not an occupant sitting on a vehicle seat has an interest in interacting with another occupant inside the vehicle cabin based on operation of an operation section by the occupant or based on a state of the occupant sitting on the vehicle seat, and to control the lighting device so as to move the position of the light in order to direct a gaze direction of the occupant toward a vehicle width direction outer side in a case in which no interest in interacting has been determined.

In the first aspect of the present disclosure, the lighting device that is configured to move the position of the light is provided inside the vehicle cabin. The lighting device is controlled by the control section. The control section determines whether or not the occupant sitting on the vehicle seat has an interest in interacting with the other occupant inside the vehicle cabin based on operation of the operation section by the occupant or based on a state of the occupant sitting on the vehicle seat. The control section controls the lighting device so as to move the position of the light in order to direct the gaze direction of the occupant toward the vehicle width direction outer side in cases in which no interest in interacting with the other occupant has been determined. As a result, the field of vision of the occupant is a natural transitioned to a state in which the other occupant inside the vehicle cabin does not easily enter.

Moreover, moving the light eliminates the need to provide a mechanism such as a seat rotation mechanism to mechanically rotate the vehicle seat in order to redirect the gaze direction of the occupant. As a result, the vehicle cabin lighting system may suppress the increase in cost and weight in comparison to structures in which a mechanically activated mechanism is employed to redirect the gaze direction of the occupant.

A second aspect of the present disclosure is a vehicle cabin lighting system including: a lighting device that is provided inside a vehicle cabin and that is configured to move a position of light; and a control section that is configured to determine whether or not an occupant sitting on a vehicle seat has an interest in interacting with another occupant inside the vehicle cabin based on operation of an operation section by the occupant or based on a state of the occupant sitting on the vehicle seat, and to control the lighting device so as to move the position of the light in order to direct a gaze direction of the occupant toward a vehicle width direction inner side in a case in which an interest in interacting has been determined.

In the second aspect of the present disclosure, the control section determines whether or not the occupant sitting on the vehicle seat has an interest in interacting with the other occupant inside the vehicle cabin based on operation of the operation section by the occupant or based on a state of the occupant sitting on the vehicle seat. The control section controls the lighting device so as to move the position of the light in order to direct the gaze direction of the occupant toward the vehicle width direction inner side in cases in which an interest in interacting with the other occupant has been determined. Thus, the gaze of the occupant may be directed naturally toward the vehicle width direction inner side, namely in the direction where the other occupant is sitting, enabling a space facilitating communication to be established. This also may suppress the increase in cost and weight in comparison to structures in which a mechanically activated mechanism is employed to redirect the gaze direction of the occupant.

In a third aspect of the present disclosure, in the first aspect or the second aspect, the lighting device may be include an cabin lamp disposed on a ceiling inside the vehicle cabin and is configured to change an irradiation direction.

In the third aspect of the present disclosure, the lighting device is includes the cabin lamp. The cabin lamp is disposed on the ceiling inside the vehicle cabin and is configured to change the irradiation direction. Thus, the position of the light may be moved simply by changing the irradiation direction of the cabin lamp.

In a fourth aspect of the present disclosure, in the second aspect, the lighting device may include an illumination unit disposed along a vehicle front-rear direction at both vehicle width direction end portions of a ceiling inside the vehicle cabin; and the control section may be configured to illuminate the illumination unit sequentially from a vehicle rear side toward a vehicle front side in a case in which the occupant has been determined to have an interest in interacting with the other occupant inside the vehicle cabin.

In the fourth aspect of the present disclosure, the lighting device includes the illumination unit. The illumination unit is disposed along the vehicle front-rear direction at both vehicle width direction end portions of the ceiling inside the vehicle cabin. The control section illuminates the illumination unit sequentially from the vehicle rear side toward the vehicle front side in cases in which the occupant has been determined to have an interest in interacting with the other occupant inside the vehicle cabin. Note that, to the human eye, the width between the left and right illumination units appears to narrow on progression away from the vantage point. The occupant therefore follows the light with their eyes during the sequential illumination from the vehicle rear side toward the vehicle front side, their gaze direction may be directed toward the vehicle width direction inner side. Note that the illumination unit referred to herein is not limited to a configuration in which an illumination region is disposed contiguously along the vehicle front-rear direction, and includes configurations in which illumination regions are disposed at a predetermined spacing in the vehicle front-rear direction.

A fifth aspect of the present disclosure, in the fourth aspect, may further include a rear-facing monitor provided at a vehicle width direction central portion of the ceiling inside the vehicle cabin, wherein the control section is configured to display a video on the rear-facing monitor after the illumination unit is illuminated or while the illumination unit is illuminated.

In the fifth aspect of the present disclosure, a video is displayed on the rear-facing monitor, thus the gaze of the occupant may be suppressed from wandering after being directed toward the vehicle width direction inner side.

In a sixth aspect of the present disclosure, in the first aspect, the lighting device may include an illumination unit disposed along a vehicle width direction in a back face of a seatback of a front seat; and the control section may be configured to illuminate the illumination unit sequentially from a vehicle width direction inner side toward the vehicle width direction outer side in a case in which the occupant has been determined not to have an interest in interacting with the other occupant inside the vehicle cabin.

In the sixth aspect of the present disclosure, the control section illuminates the illumination unit disposed in the back face of the seatback sequentially from the vehicle width direction inner side toward the vehicle width direction outer side in cases in which the occupant has been determined not to have an interest in interacting with the other occupant inside the vehicle cabin. Thus, the occupant follows the light that is illuminated sequentially with their eyes, their gaze direction may be directed toward the vehicle width direction outer side.

A seventh aspect of the present disclosure, in the sixth aspect, may further include a light emitting device provided to cause at least one of a pillar garnish or a door garnish to emit light, wherein the control section is configured to activate the light emitting device either after the illumination unit is illuminated or while the illumination unit is illuminated so as to cause the at least one of the pillar garnish or the door garnish to emit light.

In the seventh aspect of the present disclosure, activating the light emitting device that causes the at least one out of the pillar garnish or the door garnish to emit light the gaze of the occupant may be suppressed from wandering after being directed toward the vehicle width direction outer side.

An eighth aspect of the present disclosure, in the first aspect, may further include a speaker configured to output sound at different volumes to a left and a right of the occupant sitting on the vehicle seat, wherein the control section is configured to output sound from the speaker at a louder volume at the vehicle width direction outer side than at a vehicle width direction inner side in a case in which the occupant has been determined not to have an interest in interacting with the other occupant inside the vehicle cabin.

The eighth aspect of the present disclosure includes the speaker that is configured to output sound at different volumes to the left and right of the occupant sitting on the vehicle seat. The control section increases the volume on the vehicle width direction outer side in cases in which no interest in interacting with the other occupant has been determined. This gaze direction of the occupant may be directed naturally toward the vehicle width direction outer side where the volume is louder.

In a ninth aspect of the present disclosure, in the first aspect, the lighting device includes an illumination unit disposed along a vehicle front-rear direction at a vehicle width direction outer side of a door garnish; and the control section is configured to illuminate the illumination unit sequentially from a vehicle front side toward a vehicle rear side in a case in which the occupant has been determined not to have an interest in interacting with the other occupant inside the vehicle cabin.

In the ninth aspect of the present disclosure, the control section controls the lighting device so as to illuminate the illumination unit disposed along the vehicle front-rear direction at the vehicle width direction outer side of the door garnish sequentially from the vehicle front side toward the vehicle rear side in cases in which no interest in interacting with the other occupant has been determined. Thus, the occupant follows the light that is illuminated sequentially from the vehicle front side toward the vehicle rear side with their eyes, enabling their gaze direction to be directed toward the vehicle width direction outer side. Accordingly, the other occupant inside the vehicle cabin does not readily enter the field of vision of the occupant. In particular, since the door garnish is positioned at gaze height at the vehicle width direction outer side of the occupant, the door garnish may readily capture the attention of the occupant.

In a tenth aspect of the present disclosure, in the ninth aspect, the door garnish is formed with a shape that becomes shorter in a vehicle vertical direction on progression from the vehicle front side toward the vehicle rear side; and the illumination unit is illuminated sequentially from the vehicle front side toward the vehicle rear side such that a light-emitting surface area of the door garnish becomes progressively smaller.

In the tenth aspect of the present disclosure, the door garnish is formed with a shape that becomes shorter in the vehicle vertical direction on progression from the vehicle front side toward the vehicle rear side. The illumination unit disposed running along the vehicle front-rear direction at the vehicle width direction outer side of the door garnish is illuminated sequentially from the vehicle front side toward the vehicle rear side, such that the light-emitting surface area of the door garnish becomes progressively smaller. Note that in general, people have a tendency to move their gaze from larger objects to smaller objects. Accordingly, the gaze direction of the occupant may be directed toward the vehicle width direction outer side due to the occupant following the light of the door garnish with their eyes as it becomes progressively smaller.

The vehicle cabin lighting system according to the present disclosure enables all the occupants to pass the time in greater comfort while suppressing increases in cost and weight.

Moreover, the gaze direction of the occupant may be redirected using a simple structure.

Furthermore, attention may be more effectively directed toward the other occupant.

Furthermore, attention may be effectively diverted away from the other occupant.

Furthermore, the gaze direction of the occupant may be redirected more effectively than in configurations in which the gaze direction of the occupant is redirected using movement of light alone.

Furthermore, the gaze direction of the occupant may be redirected toward the vehicle width direction outer side without the occupant changing their gaze height.

Furthermore, the gaze direction of the occupant may be redirected more effectively than in configurations in which a light is moved while remaining the same size.

BRIEF DESCRIPTION OF THE DRAWINGS

Exemplary embodiments of the present disclosure will be described in detail based on the following figures, wherein:

FIG. 17A is a diagram of part of a vehicle cabin inside of a vehicle of a fourth exemplary embodiment as viewed from a vehicle rear side, illustrating a state in which a front end portion of a door garnish is lit up;

FIG. 17B is a diagram of part of a vehicle cabin inside of a vehicle of the fourth exemplary embodiment as viewed from a vehicle rear side, illustrating a state in which a front-rear direction central portion of a door garnish is lit up; and FIG. 17C is a diagram of part of a vehicle cabin inside of a vehicle of the fourth exemplary embodiment as viewed from a vehicle rear side, illustrating a state in which a rear end portion of a door garnish is lit up.

DETAILED DESCRIPTION

First Exemplary Embodiment

Explanation follows regarding a vehicle 12 applied with a vehicle cabin lighting system 10 according to a first exemplary embodiment, with reference to the drawings. Note that in the respective drawings, the arrow FR and the arrow RH respectively indicate a front direction and a right direction of the vehicle, as appropriate. In the following explanation, unless specifically stated otherwise, reference simply to front and rear, upward and downward, and left and right directions refers to front and rear in a vehicle front-rear direction, upward and downward in a vehicle vertical direction, and left and right when facing in a forward direction of the vehicle. Dimensions and scale may be exaggerated in some of the drawings in order to clarify explanation.

Figure 1:
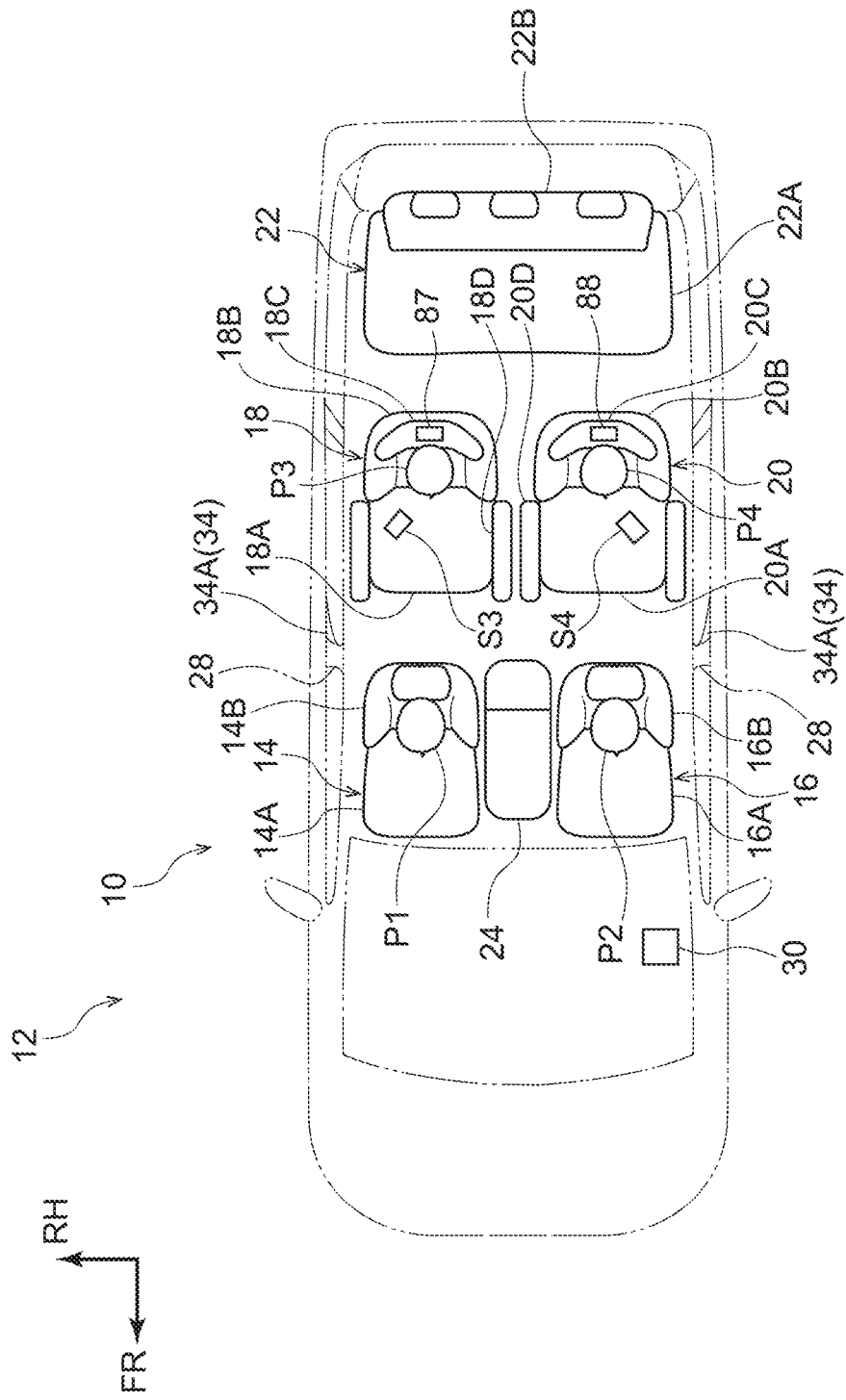
FIG. 1 is a schematic plan view illustrating relevant portions of a vehicle applied with a vehicle cabin lighting system according to a first exemplary embodiment.

As illustrated in FIG. 1, as an example the vehicle 12 of the present exemplary embodiment includes three rows of seats arrayed in the vehicle front-rear direction.

Specifically, a first seat 14 serving as a first vehicle seat and a second seat 16 serving as a second vehicle seat are arranged in a vehicle width direction in a front section inside the vehicle cabin. A third seat 18 serving as a third vehicle seat is arranged at the vehicle rear side of the first seat 14, and a fourth seat 20 serving as a fourth vehicle seat is arranged at the vehicle rear side of the second seat 16. A fifth seat 22 serving as a fifth vehicle seat is arranged at the vehicle rear side of the third seat 18 and the fourth seat 20.

The first seat 14 is arranged on the vehicle right side, and an occupant P1 sits on the first seat 14. The first seat 14 is configured including a seat cushion 14A capable of supporting the buttocks and thighs of the occupant P1 from below, and a seatback 14B capable of supporting the back of the occupant P1 from behind. A non-illustrated steering wheel is provided at the vehicle front side of the first seat 14. Namely, the first seat 14 configures a driving seat, and the occupant P1 sitting on the first seat 14 is a driver. Note that for ease of explanation, only the head of the occupant P1 is illustrated, and the body of the occupant P1 is not illustrated. Similar applies to an occupant P2, an occupant P3, and an occupant P4, described later.

The second seat 16 is arranged on the vehicle left side of the first seat 14, and the occupant P2 sits on the second seat 16. The second seat 16 is configured including a seat cushion 16A and a seatback 16B. The second seat 16 therefore configures a front passenger seat. A center console 24 is disposed between the first seat 14 and the second seat 16.

The third seat 18 is arranged at the vehicle rear side of the first seat 14, and the occupant P3 sits on the third seat 18. The third seat 18 is configured including a seat cushion 18A and a seatback 18B. A headrest 18C is provided at an upper end portion of the seatback 18B, and a right seat speaker 87 is built into the headrest 18C. The right seat speaker 87 is capable of outputting sound to the left and right of the occupant P3.

The fourth seat 20 is arranged on the vehicle left side of the third seat 18, and the occupant P4 sits on the fourth seat 20. The fourth seat 20 is configured including a seat cushion 20A and a seatback 20B. A headrest 20C is provided at an upper end portion of the seatback 20B, and a left seat speaker 88 is built into the headrest 20C. The left seat speaker 88 is capable of outputting sound to the left and right of the occupant P4.

The fifth seat 22 is arranged at the vehicle rear side of the third seat 18 and the fourth seat 20, and extends from one vehicle width direction end portion to another vehicle width direction end portion inside the vehicle cabin to configure a three-seater bench seat. The fifth seat 22 is configured including a seat cushion 22A and a seatback 22B. Note that the fifth seat 22 is vacant in FIG. 1. Namely, there are no occupants sitting on the fifth seat 22. As an example, the present exemplary embodiment enables the occupant P3 sitting on the third seat 18 and the occupant P4 sitting on the fourth seat 20 are able to pass the time in comfort. The occupant P3 is in possession of a portable terminal S3, serving as an operation section, and the occupant P4 is in possession of a portable terminal S4, serving as an operation section. The portable terminal S3 and the portable terminal S4 are smartphones.

A pillar garnish 28 configuring an interior decorative member covering a center pillar from the vehicle cabin inside is disposed on the vehicle right side between the first seat 14 and the third seat 18. A pillar garnish 28 is also disposed on the vehicle left side between the second seat 16 and the fourth seat 20. The pillar garnishes 28 each extend along the vehicle vertical direction following the respective center pillars.

Figure 2:
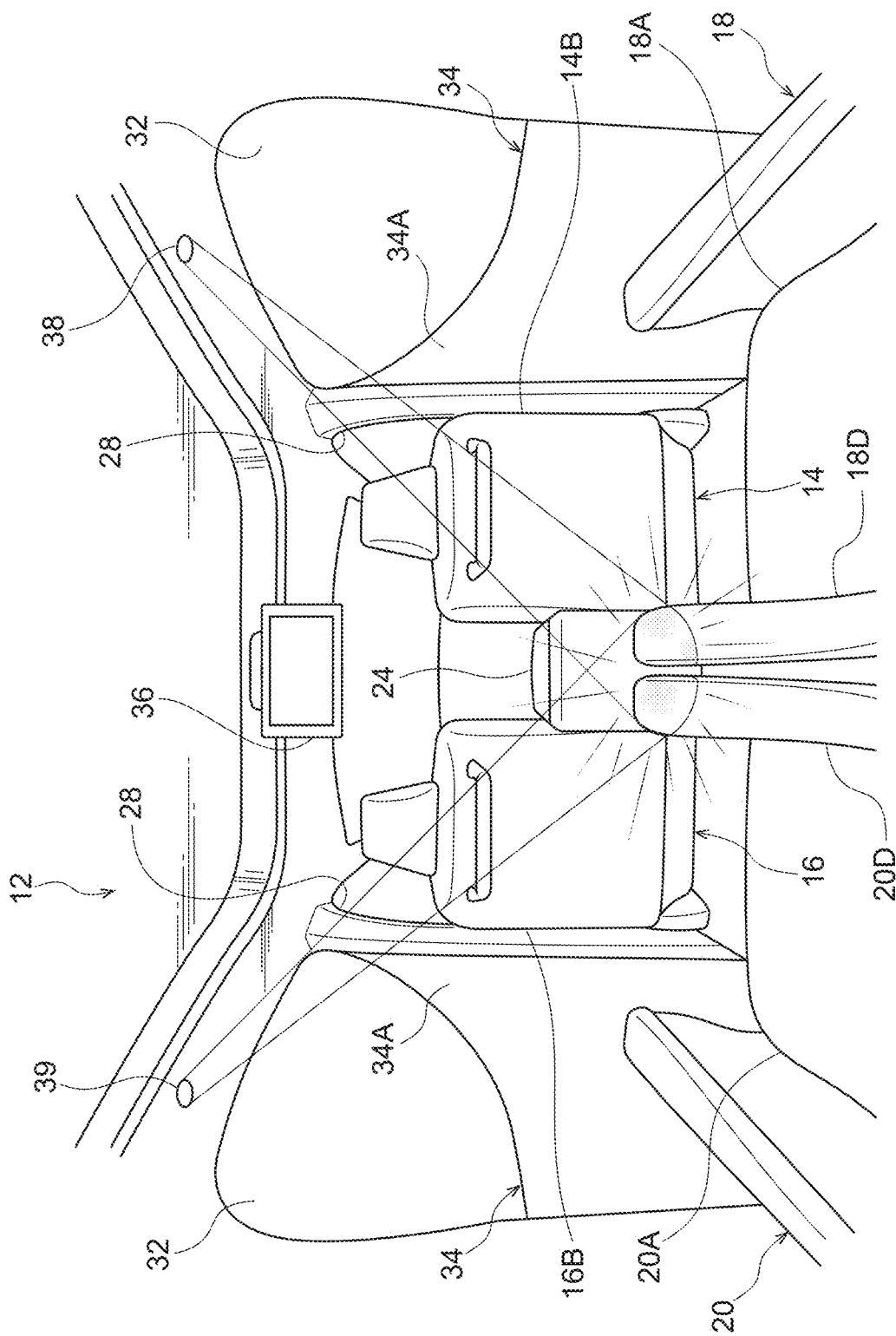
FIG. 2 is a diagram of a vehicle cabin inside of a vehicle of the first exemplary embodiment as viewed from a vehicle rear side, illustrating a state in which lighting is directed at armrests.

As illustrated in FIG. 2, rear side windows 32 are disposed at the vehicle rear sides of the respective pillar garnishes 28. A door trim 34, configuring an interior decorative member, is disposed below each of the rear side windows 32 so as to cover a side door panel from the vehicle cabin inside. A door garnish 34A is provided at the upper side of each of the door trims 34.

The door garnish 34A on the right side is provided at the vehicle front side and vehicle width direction outer side of the third seat 18. The door garnish 34A on the left side is provided at the vehicle front side and vehicle width direction outer side of the fourth seat 20. The left and right door garnishes 34A are each curved so as to be positioned further toward the vehicle upper side on progression toward the vehicle front side. Namely, the door garnishes 34A are each formed with a shape that becomes shorter in the vehicle vertical direction on progression from the vehicle front side toward the vehicle rear side.

Figure 5:
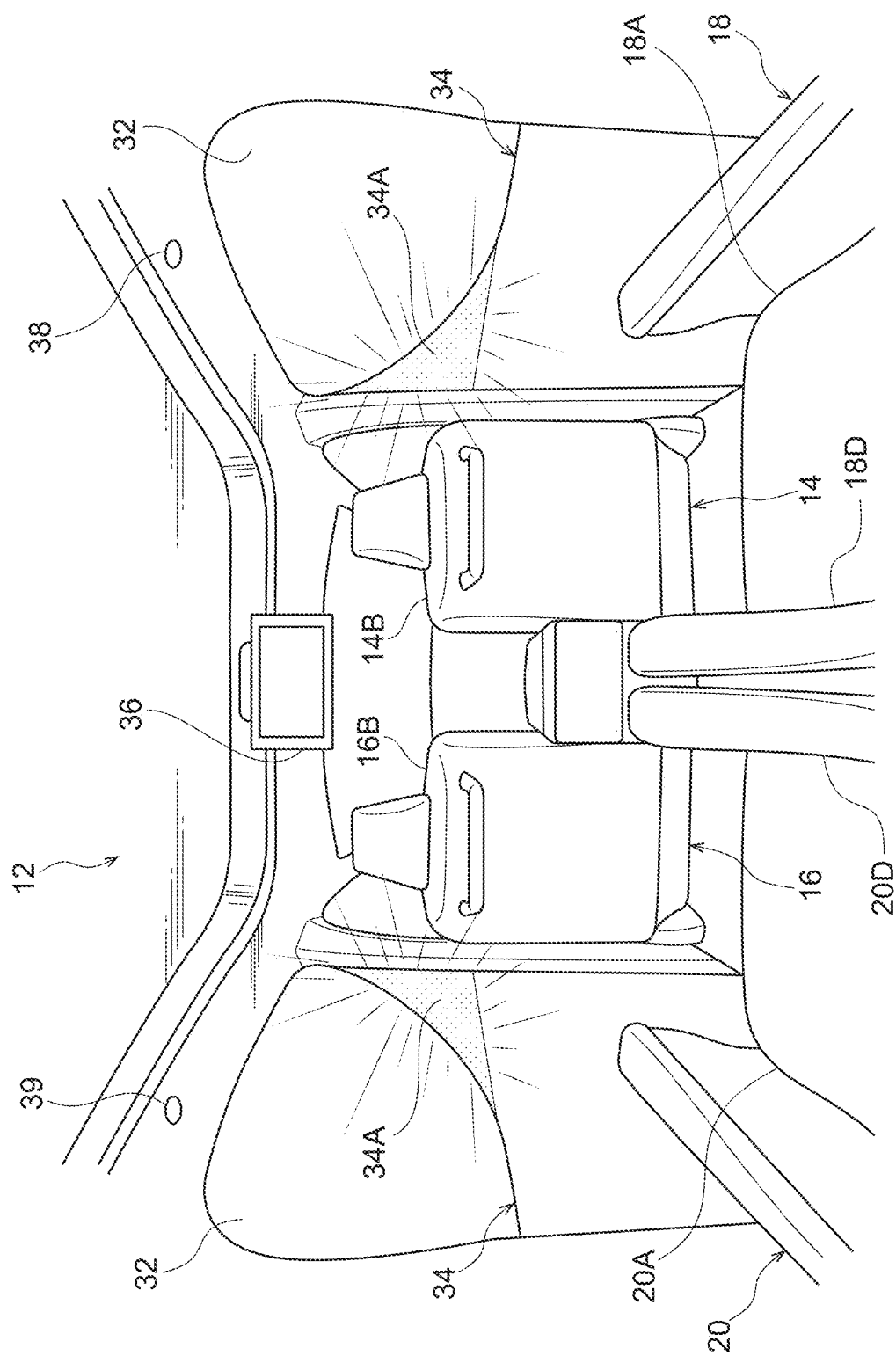
FIG. 5 is a diagram illustrating a state in which door garnishes are emitting light after the state illustrated in FIG. 4.

As illustrated in FIG. 5, the door garnish 34A on the right side is configured to emit light from its surface when a right side light emitting device 52 is activated. When emitting light from its surface, the door garnish 34A on the right side appears brighter than its surroundings. Similarly, the door garnish 34A on the left side is configured to emit light from its surface when a left side light emitting device 54 is activated. When emitting light from its surface, the door garnish 34A on the left side appears brighter than its surroundings.

A rear-facing monitor 36 is provided to a ceiling inside the vehicle cabin. The rear-facing monitor 36 is suspended from the ceiling. The rear-facing monitor 36 is visible to occupants sitting on the third seat 18, the fourth seat 20, and the fifth seat 22 in the second row and the third row. The rear-facing monitor 36 displays entertainment content such as movies or television programs.

A right side cabin lamp 38, serving as a lighting device, is provided at a vehicle right side end portion of the ceiling. A left side cabin lamp 39, serving as a lighting device, is provided at a vehicle left side end portion of the ceiling. The right side cabin lamp 38 and the left side cabin lamp 39 are configured with changeable irradiation directions. The positions of light shone from the right side cabin lamp 38 and the left side cabin lamp 39 are therefore movable.

Figure 3:
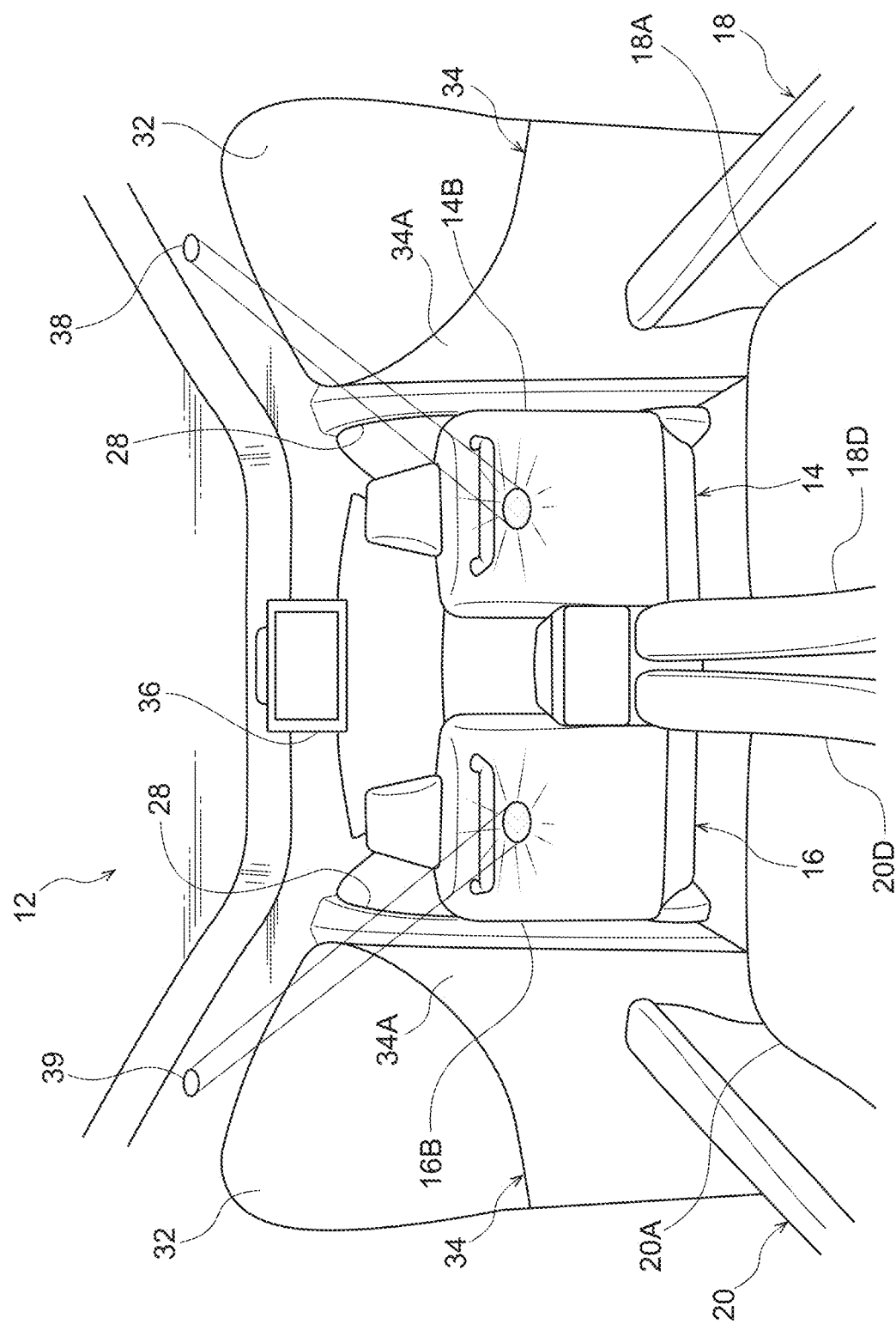
FIG. 3 is a diagram illustrating a state in which light positions have been moved onto seatbacks after the state illustrated in FIG. 2.
Figure 4:
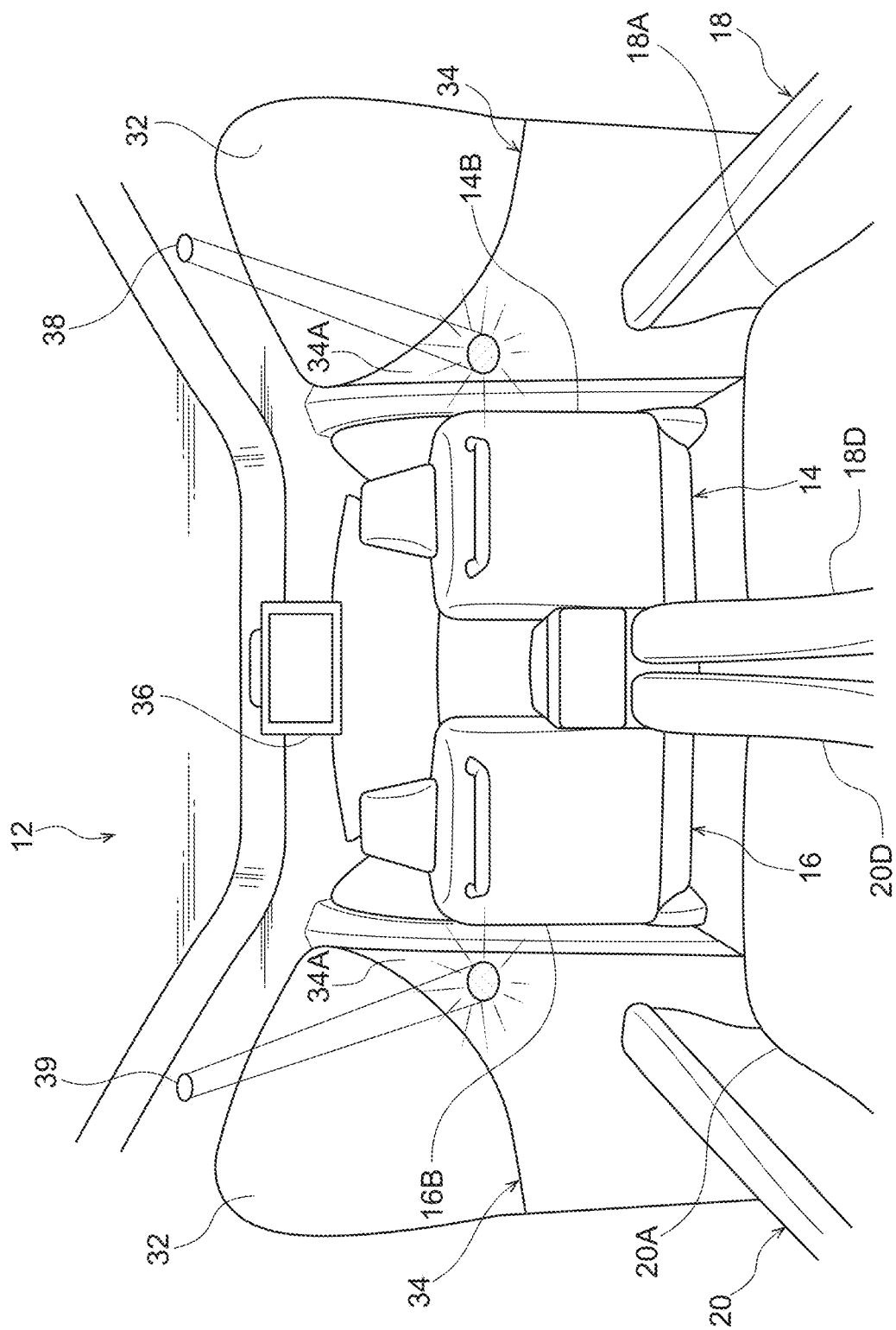
FIG. 4 is a diagram illustrating a state in which light positions have been moved onto door garnishes after the state illustrated in FIG. 3.

Note that in FIG. 2, the irradiation directions of the right side cabin lamp 38 and the left side cabin lamp 39 are respectively illustrated in a state aimed toward a leading end portion of an armrest 18D at the seat width direction inner side of the third seat 18 and a leading end portion of an armrest 20D at the seat width direction inner side of the fourth seat 20. FIG. 3 illustrates a state in which the right side cabin lamp 38 is aimed at a back face of the seatback 14B of the first seat 14, and the left side cabin lamp 39 is aimed at a back face of the seatback 16B of the second seat 16. FIG. 4 illustrates a state in which the right side cabin lamp 38 is aimed at the right side door garnish 34A, and the left side cabin lamp 39 is aimed at the left side door garnish 34A. As illustrated in FIG. 1, the vehicle 12 is provided with an electronic control unit (ECU) 30 serving as a control section, and the ECU 30 controls the irradiation directions of the right side cabin lamp 38 and the left side cabin lamp 39.

Hardware Configuration of Vehicle Cabin Lighting System 10

Figure 6:
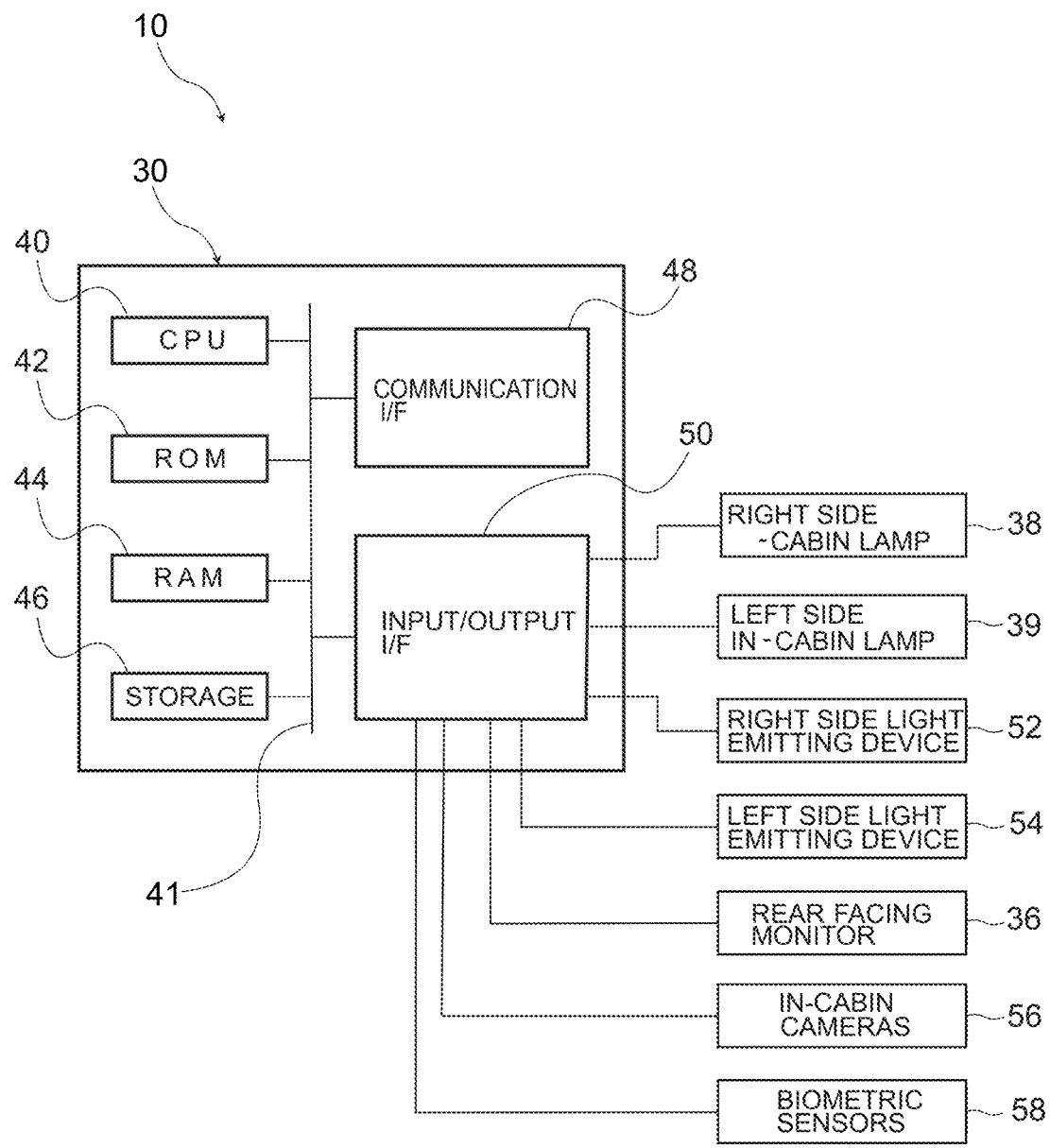
FIG. 6 is a block diagram illustrating a hardware configuration of a vehicle cabin lighting system according to the first exemplary embodiment.

FIG. 6 is a block diagram illustrating a hardware configuration of the vehicle cabin lighting system 10. As illustrated in FIG. 6, the ECU 30 of the vehicle cabin lighting system 10 is configured including a central processing unit (CPU: a processor) 40, read only memory (ROM) 42, random access memory (RAM) 44, storage 46, a communication interface 48, and an input/output interface 50. These respective configurations are connected together through a bus 41 so as to be capable of communicating with each other.

The CPU 40 is a central processing unit that executes various programs and controls various sections. Namely, the CPU 40 reads a program from the ROM 42 or the storage 46, and executes the program using the RAM 44 as a workspace. The CPU 40 controls the various configurations mentioned above and performs various arithmetic processing according to the program recorded in the ROM 42 or the storage 46.

The ROM 42 holds various programs and various data. The RAM 44 serves as a workspace that temporarily stores programs and data. The storage 46 is configured by a hard disk drive (HDD) or a solid state drive (SSD), and is a non-transitory recording medium that holds various programs including an operating system, and various data. In the present exemplary embodiment, a program and various data used to perform lighting control processing are held in the ROM 42 or the storage 46.

The communication interface 48 is an interface used by the vehicle cabin lighting system 10 to communicate with a non-illustrated server, the portable terminals S3, S4 in the possession of the occupants, and other devices. For example, the communication interface 48 employs a protocol such as Ethernet (registered trademark), LTE, FDDI, Wi-Fi (registered trademark), or Bluetooth (registered trademark).

The right side cabin lamp 38, the left side cabin lamp 39, the right side light emitting device 52, the left side light emitting device 54, the rear-facing monitor 36, cabin cameras 56, and biometric sensors 58 are each connected to the input/output interface 50. The right side cabin lamp 38 and the left side cabin lamp 39 are each provided with a non-illustrated irradiation direction switching mechanism to change the respective irradiation directions thereof. The irradiation direction switching mechanisms are activated by signals from the ECU 30 so as to change the irradiation directions of the right side cabin lamp 38 and the left side cabin lamp 39 to desired directions.

The right side light emitting device 52 is disposed at the vehicle width direction outer side of at least one out of the pillar garnish 28 or the door garnish 34A on the right side illustrated in FIG. 2. As an example, in the present exemplary embodiment, the right side light emitting device 52 is disposed at the vehicle width direction outer side of the right side door garnish 34A. Namely, the right side light emitting device 52 is disposed in a space between the right side door garnish 34A and a non-illustrated door panel, and illuminates when activated. The left side light emitting device 54 is disposed at the vehicle width direction outer side of at least one out of the pillar garnish 28 or the door garnish 34A on the left side. As an example, in the present exemplary embodiment, the left side light emitting device 54 is disposed at the vehicle width direction outer side of the left side door garnish 34A. Namely, the left side light emitting device 54 is disposed in a space between the left side door garnish 34A and a non-illustrated door panel, and illuminates when activated. Note that there is no particular limitation to illumination patterns of the right side light emitting device 52 and the left side light emitting device 54. For example, the right side light emitting device 52 and the left side light emitting device 54 might be illuminated so as to turn on and off repeatedly (i.e. so as to flash). Alternatively, the door garnish 34A may be brightened locally so as to create a visual pattern that changes over time. Moreover, the brightness and color of the right side light emitting device 52 and the left side light emitting device 54 may be configured so as to change over time.

The rear-facing monitor 36 displays a movie, television program, or the like when for example the occupant P3 instructs the ECU 30 to turn on the rear-facing monitor 36 using the portable terminal S3 illustrated in FIG. 1. Similarly, the rear-facing monitor 36 displays a movie, television program, or the like when the occupant P4 instructs the ECU 30 to turn on the rear-facing monitor 36 using the portable terminal S4 illustrated in FIG. 1. The ECU 30 may also turn on the rear-facing monitor 36 under predetermined conditions even if not instructed to do so by the occupant P3 or the occupant P4.

The cabin cameras 56 are, for example, disposed on an instrument panel and on the ceiling. The cabin cameras 56 image the occupants sitting on the third seat 18, the fourth seat 20, and the fifth seat 22. Image data of the occupants captured by the cabin cameras 56 is transmitted to the ECU 30. In the present exemplary embodiment, since there is no occupant sitting on the fifth seat 22, the cabin cameras 56 image the occupant P3 on the third seat 18 and the occupant P4 on the fourth seat 20.

The biometric sensors 58 are, for example, provided in the seatback 18B of the third seat 18, the seatback 20B of the fourth seat 20, and the seatback 22B of the fifth seat 22. The biometric sensors 58 acquire biometric signals from the occupants sitting on the third seat 18, the fourth seat 20, and the fifth seat 22, and transmit these to the ECU 30. The biometric signals referred to here include heartrate signals and respiration signals.

Functional Configuration of Vehicle Cabin Lighting System 10

The vehicle cabin lighting system 10 implements various functionality using the hardware resources described above. Explanation follows regarding functional configurations implemented by the vehicle cabin lighting system 10, with reference to FIG. 7.

Figure 7:
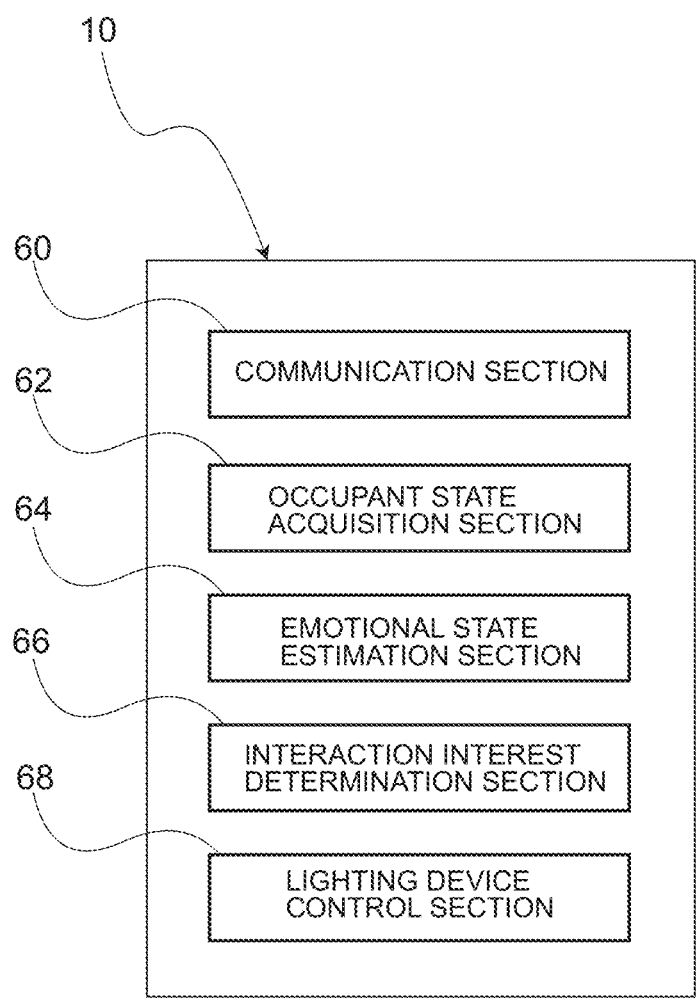
FIG. 7 is a block diagram illustrating functional configuration of a vehicle cabin lighting system according to the first exemplary embodiment.

As illustrated in FIG. 7, the functional configuration of the vehicle cabin lighting system 10 includes a communication section 60, an occupant state acquisition section 62, an emotional state estimation section 64, an interaction interest determination section 66, and a lighting device control section 68. Note that this functional configuration is implemented by the CPU 40 reading and executing a program stored in the ROM 42 or the storage 46.

The communication section 60 exchanges data with an external server and other devices through the communication interface 48. For example, the communication section 60 exchanges data with the portable terminals S3, S4 in the possession of the occupants sitting on the various vehicle seats.

The occupant state acquisition section 62 acquires states of the occupants sitting on the third seat 18, the fourth seat 20, and the fifth seat 22. Specifically, the occupant state acquisition section 62 receives data from the cabin cameras 56 and the biometric sensors 58 in order to acquire the states of the occupant P3 and the occupant P4. For example, gaze direction, alertness level, and facial expression of both the occupant P3 and the occupant P4 are detected based on the image data captured by the cabin cameras 56. The occupant state acquisition section 62 also extracts a HF component as a high frequency fluctuation component corresponding to fluctuations in respiration, and a LF component as a low frequency component corresponding to Mayer waves, these being blood pressure fluctuations, from time series data of fluctuations in the heartrates of the occupant P3 and the occupant P4 as acquired by the biometric sensors 58. Extracting the HF component and the LF component enables stress states of the occupant P3 and the occupant P4 to be determined. Namely, since the HF component appears when the parasympathetic nervous system is dominant, the ratio of LF to HF reveals the activity level of the sympathetic nervous system. A relaxed state may be surmised when the parasympathetic nervous system is activated. A stressed state may be surmised when the sympathetic nervous system is activated.

The emotional state estimation section 64 estimates the emotional states of the occupant P3 and the occupant P4 sitting on the third seat 18, and the fourth seat 20, and of any occupant sitting on the fifth seat 22. Specifically, the emotional state estimation section 64 estimates the emotional states of the occupant P3 and the occupant P4 based on data received from the cabin cameras 56 and the biometric sensors 58. For example, the emotional state estimation section 64 may read the facial expressions of the occupant P3 and the occupant P4 from the image data captured by the cabin cameras 56 in order to estimate their emotional states. Alternatively, the emotional state estimation section 64 may estimate the emotional states of the occupant P3 and the occupant P4 from pulse rates acquired by the biometric sensors 58.

The interaction interest determination section 66 determines whether or not each of the occupant P3 and the occupant P4 sitting on the third seat 18 and the fourth seat 20, and any occupant sitting on the fifth seat 22 has an interest in interacting with another occupant inside the vehicle cabin. Specifically, in cases in which the occupant P3 operates their portable terminal S3 so as to transmit a signal to the ECU 30, the interaction interest determination section 66 determines whether or not the occupant P3 has an interest in interacting with the other occupant P4, based on the operation of the portable terminal S3 by the occupant P3. Moreover, in cases in which the occupant P4 operates their portable terminal S4 so as to transmit a signal to the ECU 30, the interaction interest determination section 66 determines whether or not the occupant P4 has an interest in interacting with the other occupant P3, based on the operation of the portable terminal S4 by the occupant P4. For example, in a case in which the occupant P3 sitting on the third seat 18 in FIG. 1 operates their portable terminal S3 to transmit a signal to the ECU 30 to indicate that they wish to be left alone, the interaction interest determination section 66 determines that the occupant P3 does not have an interest in interacting with the other occupant P4.

Conversely, in a case in which the occupant P3 sitting on the third seat 18 operates their portable terminal S3 to transmit a signal to the ECU 30 to indicate that they wish to engage with the other occupant P4, the interaction interest determination section 66 determines that the occupant P3 does have an interest in interacting with the other occupant P4.

Even in cases in which neither the portable terminal S3 nor the portable terminal S4 has been operated, the interaction interest determination section 66 determines whether or not there is an interest in interacting with other occupants based on signals from the occupant state acquisition section 62 and the emotional state estimation section 64. For example, the ECU 30 measures the length of time for which the gaze of the occupant P3 is directed toward the vehicle exterior within a predetermined timeframe, based on the image data of the occupant P3 captured by the cabin cameras 56. In cases in which the gaze of the occupant P3 is directed toward the vehicle exterior for a long time, the interaction interest determination section 66 determines that the occupant P3 does not have an interest in interacting with the other occupant P4.

Alternatively, for example, the interaction interest determination section 66 may determine that the occupant P3 does not have an interest in interacting with the other occupant P4 in cases in which the occupant P3 has been estimated to be in a stressed state by the functionality of the emotional state estimation section 64, based on time series data regarding the heartrate fluctuations of the occupant P3. Conversely, the interaction interest determination section 66 may determine that the occupant P3 does have an interest in interacting with the other occupant P4 in cases in which the occupant P3 has been estimated to be in a relaxed state by the functionality of the emotional state estimation section 64.

In cases in which the occupant P3 has been determined not to have an interest in interacting with the other occupant P4 by the functionality of the interaction interest determination section 66, the lighting device control section 68 controls the right side cabin lamp 38 so as to move the position of the light therefrom in order to direct the gaze direction of the occupant P3 toward the vehicle width direction outer side. Specifically, the lighting device control section 68 initially shines the light from the right side cabin lamp 38 onto the leading end portion of the armrest 18D and the leading end portion of the armrest 20D as illustrated in FIG. 2. Next, the lighting device control section 68 moves the position of the light from the right side cabin lamp 38 toward the vehicle front side and the vehicle right side so as to shine the light onto the back face of the seatback 14B as illustrated in FIG. 3. The lighting device control section 68 then moves the position of the light from the right side cabin lamp 38 toward the vehicle right side so to shine the light onto the right side door garnish 34A as illustrated in FIG. 4. Note that as an example in the present exemplary embodiment, the right side cabin lamp 38 is controlled in order to repeatedly move the position of the light from the position illustrated in FIG. 2 to the position illustrated in FIG. 4. Namely, the right side cabin lamp 38 is extinguished after the state illustrated in FIG. 4, and the light is again shone onto the position illustrated in FIG. 2 before changing the irradiation direction again to achieve the state in which the light is shone onto the position illustrated in FIG. 4. Repeatedly moving the light from the position illustrated in FIG. 2 to the position illustrated in FIG. 4 in this manner naturally directs the gaze of the occupant P3 toward the right side door garnish 34A, such that the occupant P4 does not readily enter the field of vision of the occupant P3.

Similarly, in cases in which the occupant P4 has been determined not to have an interest in interacting with the other occupant P3 by the functionality of the interaction interest determination section 66, the lighting device control section 68 controls the left side cabin lamp 39 so as to move the position of the light therefrom in order to direct the gaze direction of the occupant P4 toward the vehicle width direction outer side. Specifically, the left side cabin lamp 39 is controlled so as to repeatedly move the position of the light from the position illustrated in FIG. 2 to the position illustrated in FIG. 4. This directs the gaze of the occupant P4 naturally toward the left side door garnish 34A, such that the occupant P3 does not readily enter the field of vision of the occupant P4. In this manner, the present exemplary embodiment is configured such that the right side cabin lamp 38 and the left side cabin lamp 39 are controlled independently of each other. Thus, for example, the right side cabin lamp 38 may be activated on its own.

Moreover, after the lighting device control section 68 of the present exemplary embodiment has directed the gaze of the occupant P3 toward the right side door garnish 34A using the right side cabin lamp 38, the right side light emitting device 52 is activated as illustrated in FIG. 5 such that the right side door garnish 34A emits light from its surface. Similarly, after the lighting device control section 68 has directed the gaze of the occupant P4 toward the left side door garnish 34A using the left side cabin lamp 39, the left side light emitting device 54 is activated as illustrated in FIG. 5 such that the left side door garnish 34A emits light from its surface. Note that the lighting device control section 68 may cause the right side door garnish 34A to emit light from its surface while the right side cabin lamp 38 is illuminated. Moreover, the lighting device control section 68 may cause the left side door garnish 34A to emit light from its surface while the left side cabin lamp 39 is illuminated.

Operation

Explanation follows regarding operation of the present exemplary embodiment.

Lighting Control Processing

Figure 8:
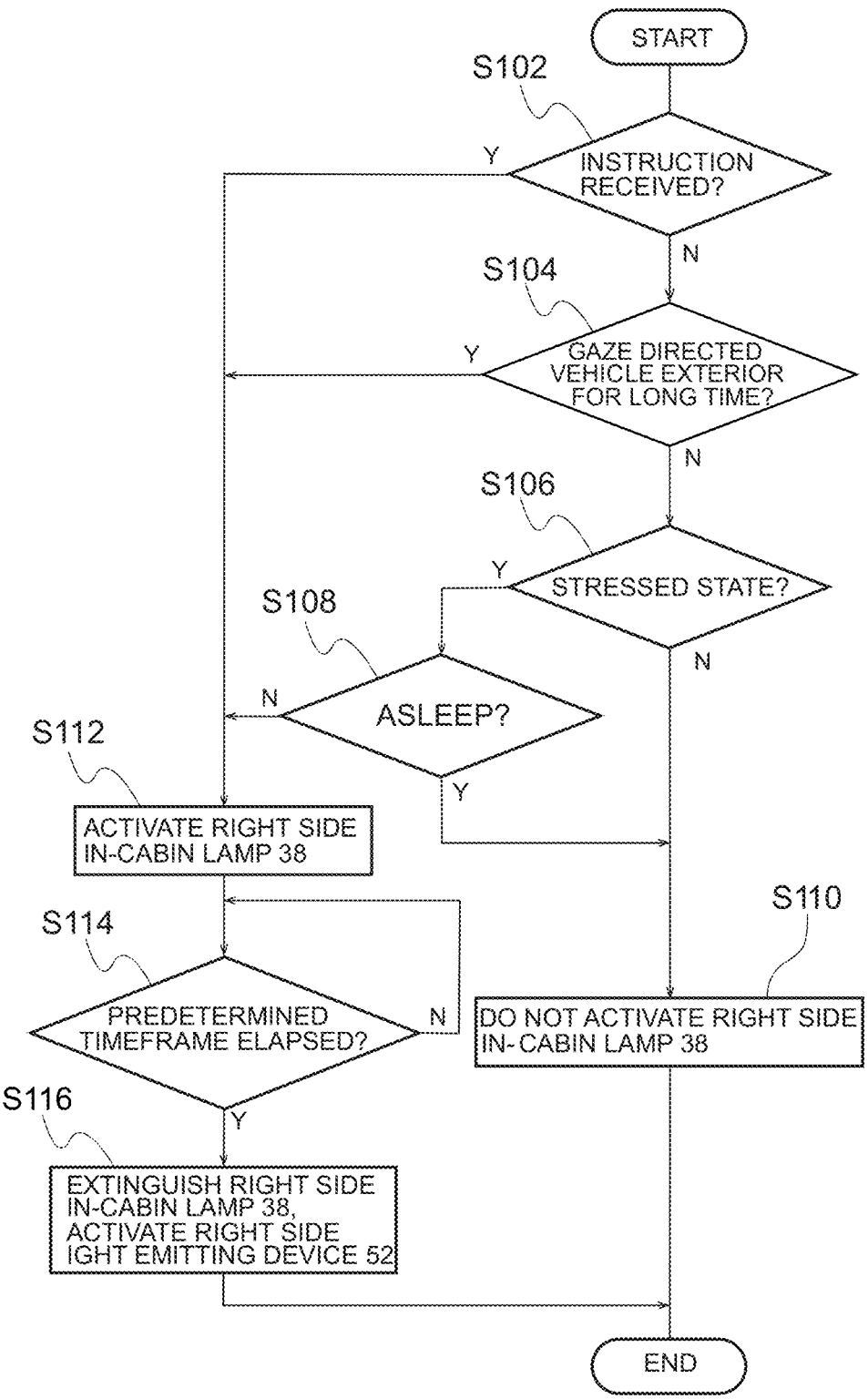
FIG. 8 is a flowchart illustrating an example of a flow of lighting control processing in the first exemplary embodiment.

Explanation follows regarding an example of the lighting control processing, with reference to the flowchart illustrated in FIG. 8. This lighting control processing is executed by the CPU 40 reading the program from the ROM 42 or the storage 46, and expanding and executing the program in the RAM 44. Note that although in the following explanation, an example is described in which the processing is executed for the occupant P3 sitting on the third seat 18, processing would be executed similarly for the occupant P4 sitting on the fourth seat 20.

As illustrated in FIG. 8, at step S102, the CPU 40 determines whether or not an instruction has been received from the occupant P3. Specifically, the CPU 40 uses the functionality of the communication section 60 to detect operation of the portable terminal S3 by the occupant P3 in order to determine whether or not an instruction has been received. The instruction referred to here is an instruction indicating that the occupant wishes to be left alone. In cases in which any other instruction has been transmitted, the CPU 40 determines that an instruction has not been received at step S102.

In cases in which the CPU 40 has determined that an instruction indicating that the occupant P3 wishes to be left alone has been received from the occupant P3 at step S102, processing transitions to step S112. In cases in which the CPU 40 has determined that an instruction indicating that the occupant P3 wishes to be left alone has not been received from the occupant P3 at step S102, processing transitions to step S104. Note that the processing of step S104 is described first, and the processing of step S112 will be described later.

At step S104, the CPU 40 determines whether or not the occupant P3 has been directing their gaze toward the vehicle exterior for a long time. Specifically, the CPU 40 uses the functionality of the occupant state acquisition section 62 to measure the total time for which the occupant P3 has directed their gaze toward the vehicle exterior during the predetermined timeframe based on the image data of the occupant P3 captured by the cabin cameras 56. For example, in cases in which the total time for which the occupant P3 has directed their gaze to the vehicle exterior during the predetermined timeframe is greater than a predetermined proportion of the predetermined timeframe, the CPU 40 determines that the occupant P3 has been directing their gaze to the vehicle exterior for a long time.

In cases in which the CPU 40 has determined that the occupant P3 has been directing their gaze toward the vehicle exterior for a long time at step S104, processing transitions to step S112. In cases in which the CPU 40 has determined that the occupant P3 has not been directing their gaze toward the vehicle exterior for a long time at step S104, namely in cases in which the CPU 40 has determined that the occupant P3 has been directing their gaze toward the vehicle exterior for a short time, processing transitions to step S106. The processing of step S106 is described first, and the processing of step S112 will be described later.

At step S106, the CPU 40 determines whether or not the occupant P3 is in a stressed state. Specifically, the CPU 40 uses the functionality of the occupant state acquisition section 62 to estimate whether the occupant P3 is in a stressed state or in a relaxed state based on the time series data regarding heartrate fluctuations. In cases in which the CPU 40 has determined that the occupant P3 is in a stressed state, processing transitions to step S108. In cases in which the CPU 40 has determined that the occupant P3 is not in a stressed state, processing transitions to step S110.

At step S108, the CPU 40 determines whether or not the occupant P3 is asleep. Specifically, the CPU 40 uses the functionality of the occupant state acquisition section 62 to determine that the occupant P3 is asleep in cases in which the eyes of the occupant P3 have been closed for a predetermined timeframe or greater, based on image data captured by the cabin cameras 56. In addition to using the image data captured by the cabin cameras 56, the CPU 40 may also determine that the occupant P3 is asleep in cases in which the alertness level of the occupant P3 is low, based on the heartrate signal for the occupant P3 acquired by the biometric sensors 58.

In cases in which the CPU 40 has determined that the occupant P3 is asleep at step S108, processing transitions to step S110. In cases in which the CPU 40 has determined that the occupant P3 is not asleep at step S108, processing transitions to step S112.

At step S110, the CPU 40 does not activate the right side cabin lamp 38. Namely, the lighting control processing is ended without shining light into the vehicle cabin. Note that in cases in which the right side cabin lamp 38 is already in an activated state, the right side cabin lamp 38 may be extinguished and the lighting control processing then ended.

On the other hand, processing transitions to step S112 and the right side cabin lamp 38 is activated in cases in which the CPU 40 has determined that an instruction indicating that the occupant P3 wishes to be left alone has been received from the occupant P3 at step S102, in cases in which the CPU 40 has determined that the occupant P3 has been directing their gaze toward the vehicle exterior for a long time at step S104, and also in cases in which the CPU 40 has determined that the occupant P3 is not asleep at step S108. Light is thereby shone onto the armrest 18D and the armrest 20D from the right side cabin lamp 38. The non-illustrated irradiation direction switching mechanism is also activated such that the irradiation direction switching mechanism moves the light shone from the right side cabin lamp 38 toward the vehicle width direction outer side as far as the right side door garnish 34A.

Next, at step S114, the CPU 40 determines whether or not a predetermined timeframe has elapsed. Specifically, the CPU 40 measures the time since the right side cabin lamp 38 was initially illuminated, and in cases in which the predetermined timeframe has elapsed processing transitions to step S116. Note that as an alternative to determining whether or not a predetermined timeframe has elapsed at step S114, determination may be made as to whether or not the light has been moved a predetermined number of times. For example, processing may transition to step S116 in cases in which the number of times that the light shone onto the armrest 18D and the armrest 20D has been moved as far as the right side door garnish 34A has reached the predetermined number of times.

At step S116, the CPU 40 extinguishes the right side cabin lamp 38. The CPU 40 also activates the right side light emitting device 52 such that the right side door garnish 34A emits light from its surface. The CPU 40 then ends the lighting control processing.

As described above, in the vehicle cabin lighting system 10 of the present exemplary embodiment, in cases in which the occupant P3 has been determined not to have an interest in interacting with the other occupant P4, the right side cabin lamp 38 is controlled so as to move the position of the light in order to direct the gaze direction of the occupant P3 toward the vehicle width direction outer side. This enables a natural transition to a state in which the other occupant P4 inside the vehicle cabin does not easily enter the field of vision of the occupant P3. Similarly, in cases in which the occupant P4 has been determined not to have an interest in interacting with the other occupant P3, the left side cabin lamp 39 is controlled so as to move the position of the light in order to direct the gaze direction of the occupant P4 toward the vehicle width direction outer side. This enables a natural transition to a state in which the other occupant P3 inside the vehicle cabin does not easily enter the field of vision of the occupant P4.

Moreover, moving the light eliminates the need to provide a mechanism such as a seat rotation mechanism to mechanically rotate the vehicle seats in order to redirect the gaze directions of the occupant P3 and the occupant P4. This enables increases in cost and weight to be suppressed in comparison to structures in which a mechanically activated mechanism is employed to redirect the gaze directions of the occupant P3 and the occupant P4. Namely, this enables all the occupants to pass the time in greater comfort while suppressing increases in cost and weight.

In the present exemplary embodiment, the lighting device is configured including the right side cabin lamp 38 and the left side cabin lamp 39 with changeable irradiation directions disposed on the ceiling inside the vehicle cabin. This enables the positions of the light to be moved simply by changing the irradiation directions of the right side cabin lamp 38 and the left side cabin lamp 39. Namely, the gaze directions of the occupant P3 and the occupant P4 may be redirected using a simple structure.

In the present exemplary embodiment, the right side light emitting device 52 and the left side light emitting device 54 are activated to cause at least one out of the pillar garnishes 28 or the door garnishes 34A to emit light, enabling the gazes of the occupant P3 and the occupant P4 to be suppressed from wandering after being directed toward the vehicle width direction outer side. This enables attention to be more effectively diverted away from the other occupant.

Second Exemplary Embodiment

Next, explanation follows regarding a vehicle cabin lighting system 70 according to a second exemplary embodiment of the present disclosure, with reference to FIG. 9 to FIG. 13. Note that configurations similar to those of the first exemplary embodiment are allocated the same reference numerals, and explanation thereof is omitted where appropriate.

Figure 9:
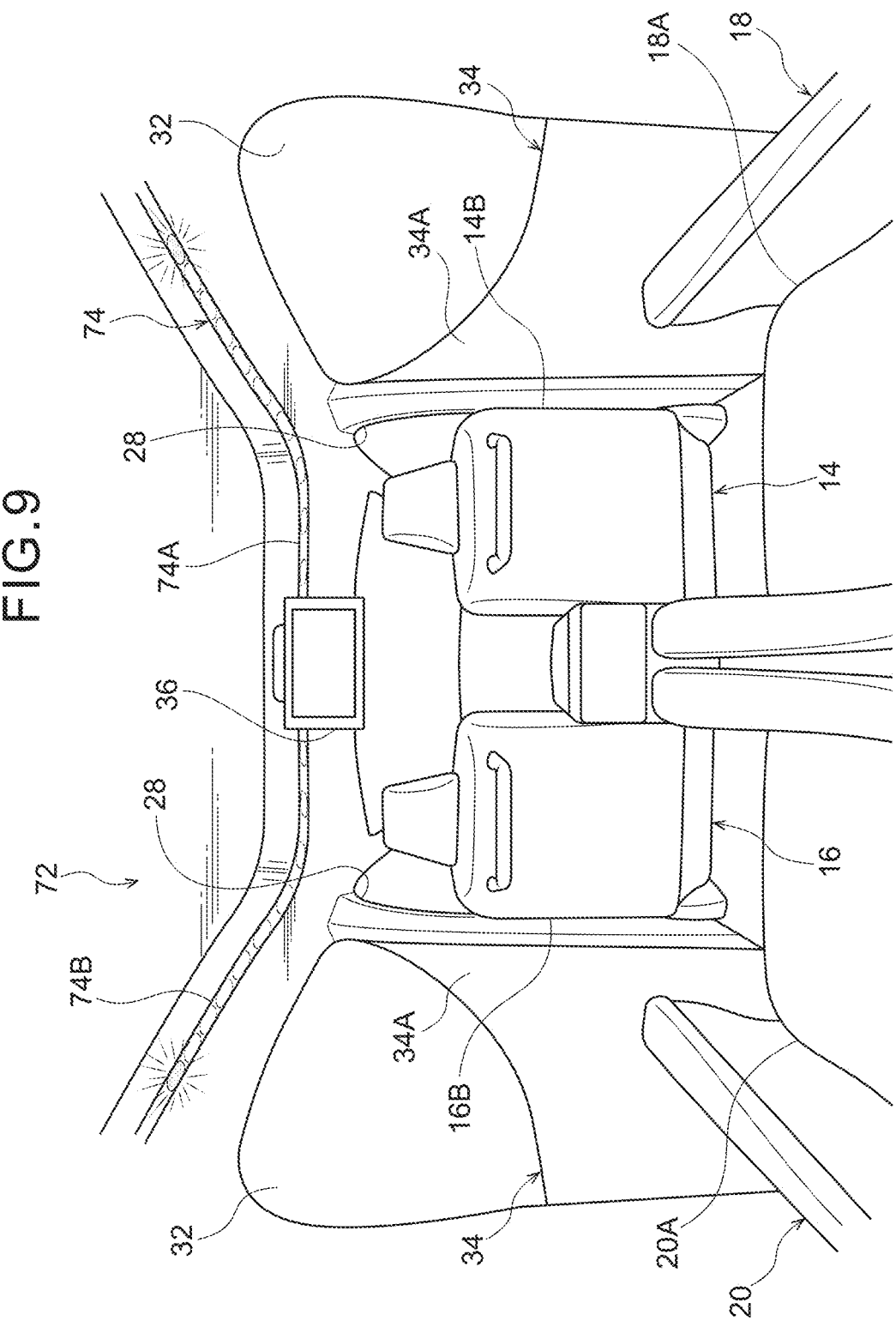
FIG. 9 is a diagram of a vehicle cabin inside of a vehicle of a second exemplary embodiment as viewed from a vehicle rear side, illustrating a state in which light is being moved.

As illustrated in FIG. 9, a vehicle 72 applied with the vehicle cabin lighting system 70 according to the present exemplary embodiment includes a ceiling lighting device 74 inside the vehicle cabin. The ceiling lighting device 74 is configured including a right side illumination unit 74A disposed on the vehicle right side, and a left side illumination unit 74B disposed on the vehicle left side.

The right side illumination unit 74A is disposed running along the vehicle front-rear direction at a vehicle width direction right side end portion of the ceiling inside the vehicle cabin. A front end portion of the right side illumination unit 74A curves toward the vehicle width direction inner side following the ceiling, and extends as far as the vicinity of the rear-facing monitor 36. Plural light sources are arrayed in the right side illumination unit 74A, and are configured so as to be able to be illuminated sequentially from the vehicle rear side toward the vehicle front side.

The left side illumination unit 74B is disposed running along the vehicle front-rear direction at a vehicle width direction left side end portion of the ceiling inside the vehicle cabin. A front end portion of the left side illumination unit 74B curves toward the vehicle width direction inner side following the ceiling, and extends as far as the vicinity of the rear-facing monitor 36. Plural light sources are arrayed in the left side illumination unit 74B, and are configured so as to be able to be illuminated sequentially from the vehicle rear side toward the vehicle front side.

Hardware Configuration of Vehicle Cabin Lighting System 70

Figure 11:
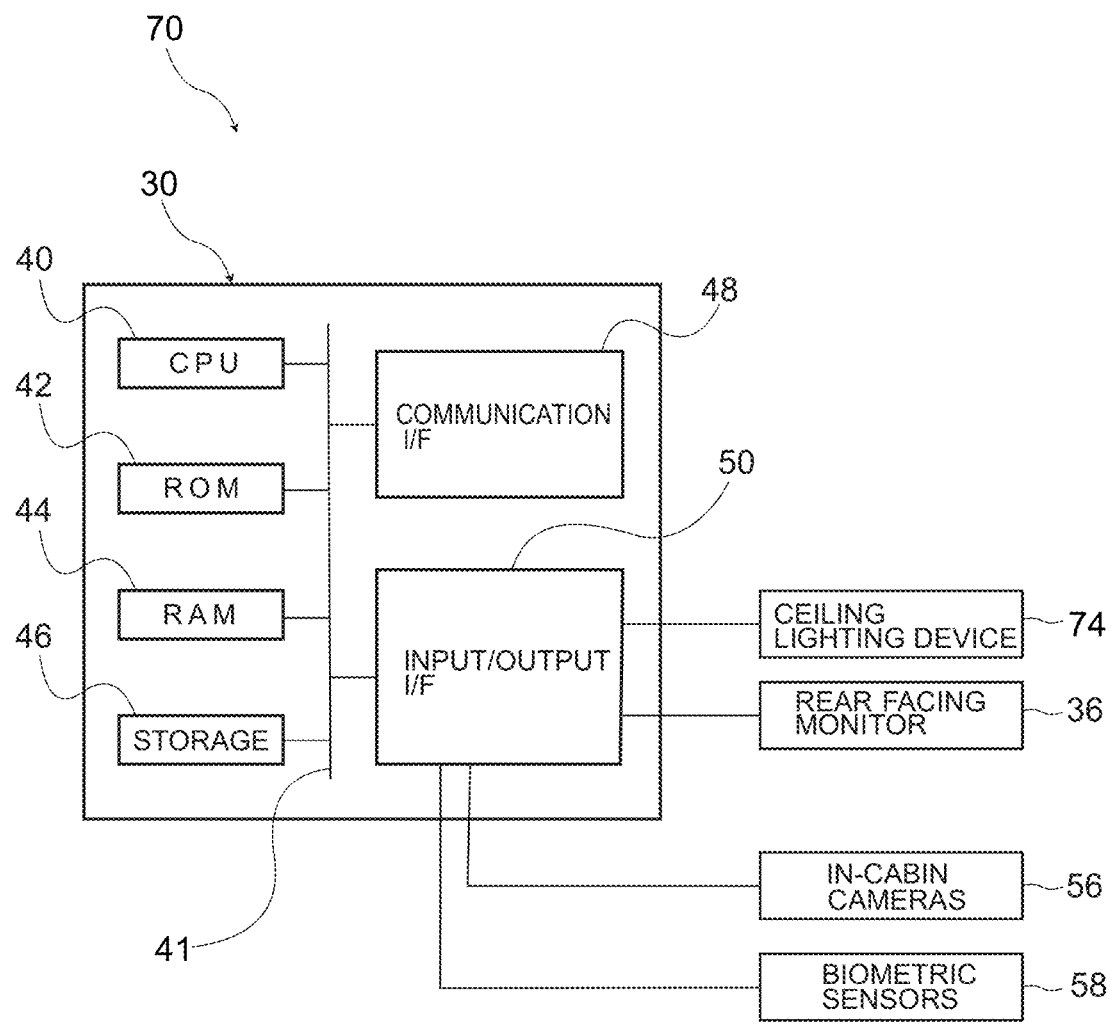
FIG. 11 is a block diagram illustrating a hardware configuration of a vehicle cabin lighting system according to the second exemplary embodiment.

FIG. 11 is a block diagram illustrating a hardware configuration of the vehicle cabin lighting system 70. As illustrated in FIG. 11, an ECU 30 of the vehicle cabin lighting system 70 is configured including a CPU 40, ROM 42, RAM 44, storage 46, a communication interface 48, and an input/output interface 50.

The ceiling lighting device 74, the rear-facing monitor 36, the cabin cameras 56, and the biometric sensors 58 are each connected to the input/output interface 50.

Functional Configuration of Vehicle Cabin Lighting System 70

Various functionality of the vehicle cabin lighting system 70 is implemented using the hardware resources described above. Explanation follows regarding functional configurations implemented by the vehicle cabin lighting system 70, with reference to FIG. 12.

Figure 12:
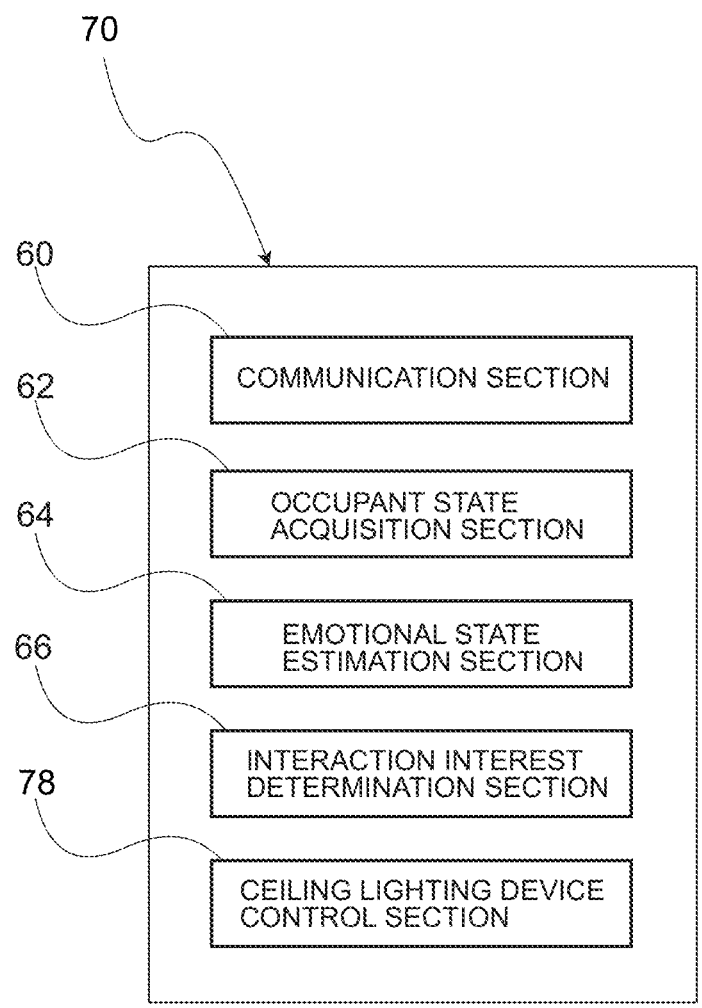
FIG. 12 is a block diagram illustrating functional configuration of a vehicle cabin lighting system according to the second exemplary embodiment.

As illustrated in FIG. 12, functional configuration of the vehicle cabin lighting system 70 includes a communication section 60, an occupant state acquisition section 62, an emotional state estimation section 64, an interaction interest determination section 66, and a ceiling lighting device control section 76. Note that this functional configuration is implemented by the CPU 40 reading and executing a program stored in the ROM 42 or the storage 46.

The occupant state acquisition section 62 acquires states of the occupant P3 and the occupant P4 by receiving data from the cabin cameras 56 and the biometric sensors 58, similarly to in the first exemplary embodiment. The emotional state estimation section 64 estimates the emotional states of the occupant P3 and the occupant P4 based on the data received from the cabin cameras 56 and the biometric sensors 58.

The interaction interest determination section 66 determines whether or not the occupant P3 and the occupant P4 sitting on the third seat 18 and the fourth seat 20, and any occupant sitting on the fifth seat 22 has an interest in interacting with another occupant inside the vehicle cabin. Specifically, in cases in which the occupant P3 operates their portable terminal S3 so as to transmit a signal to the ECU 30, the interaction interest determination section 66 determines whether or not the occupant P3 has an interest in interacting with the other occupant P4 based on the received signal. In cases in which the occupant P4 operates their portable terminal S4 so as to transmit a signal to the ECU 30, the interaction interest determination section 66 determines whether or not the occupant P4 has an interest in interacting with the other occupant P3 based on the received signal. For example, in a case in which the occupant P3 sitting on the third seat 18 in FIG. 8 operates their portable terminal S3 to transmit a signal to the ECU 30 to indicate that they wish to talk to the other occupant P4, the interaction interest determination section 66 determines that the occupant P3 has an interest in interacting with the other occupant P4.

Even in cases in which neither the portable terminal S3 nor the portable terminal S4 has been operated, the interaction interest determination section 66 determines whether or not there is an interest in interacting with the other occupant based on signals from the occupant state acquisition section 62 and the emotional state estimation section 64. For example, the ECU 30 measures the length of time for which the gaze of the occupant P3 is directed toward the occupant P4 within the predetermined timeframe based on the image data of the occupant P3 captured by the cabin cameras 56. In cases in which the gaze of the occupant P3 is directed toward the occupant P4 for a long time, the interaction interest determination section 66 determines that the occupant P3 has an interest in interacting with the other occupant P4.

Alternatively, for example, the interaction interest determination section 66 may determine that the occupant P3 has an interest in interacting with the other occupant P4 in cases in which the occupant P3 has been estimated to be in a relaxed state by the functionality of the emotional state estimation section 64, based on time series data regarding heartrate fluctuations of the occupant P3.

In cases in which the occupant P3 has been determined to have an interest in interacting with the other occupant P4 by the functionality of the interaction interest determination section 66, the ceiling lighting device control section 76 activates the ceiling lighting device 74. The ceiling lighting device control section 76 thereby illuminates the right side illumination unit 74A and the left side illumination unit 74B of the ceiling lighting device 74 and moves the positions of the light therefrom so as to direct the gaze directions of the occupant P3 and the occupant P4 toward the vehicle width direction inner side. Specifically, the ceiling lighting device control section 76 illuminates the right side illumination unit 74A and the left side illumination unit 74B sequentially from the vehicle rear side toward the vehicle front side.

Figure 10:
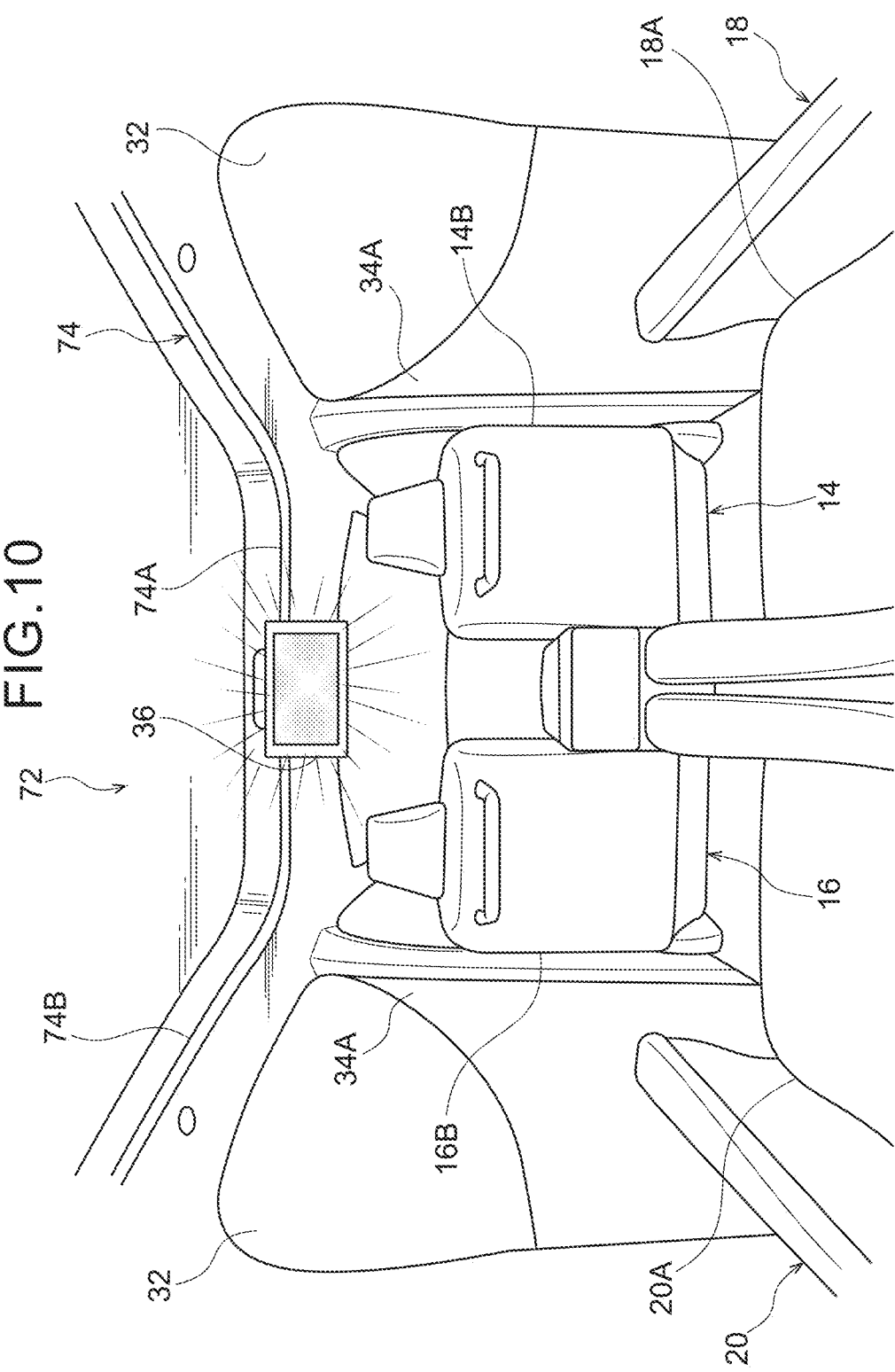
FIG. 10 is a diagram illustrating a state in which a rear-facing monitor has been activated following the state illustrated in FIG. 9.

After using the right side illumination unit 74A and the left side illumination unit 74B to direct the gazes of the occupant P3 and the occupant P4 toward the vehicle width direction inner side, the ceiling lighting device control section 76 of the present exemplary embodiment also activates the rear-facing monitor 36 and displays a video on the rear-facing monitor 36, as illustrated in FIG. 10. Note that the ceiling lighting device control section 76 may also display a video on the rear-facing monitor 36 while the right side illumination unit 74A and the left side illumination unit 74B are illuminated.

Operation

Next, explanation follows regarding operation of the present exemplary embodiment.

Lighting Control Processing

Figure 13:
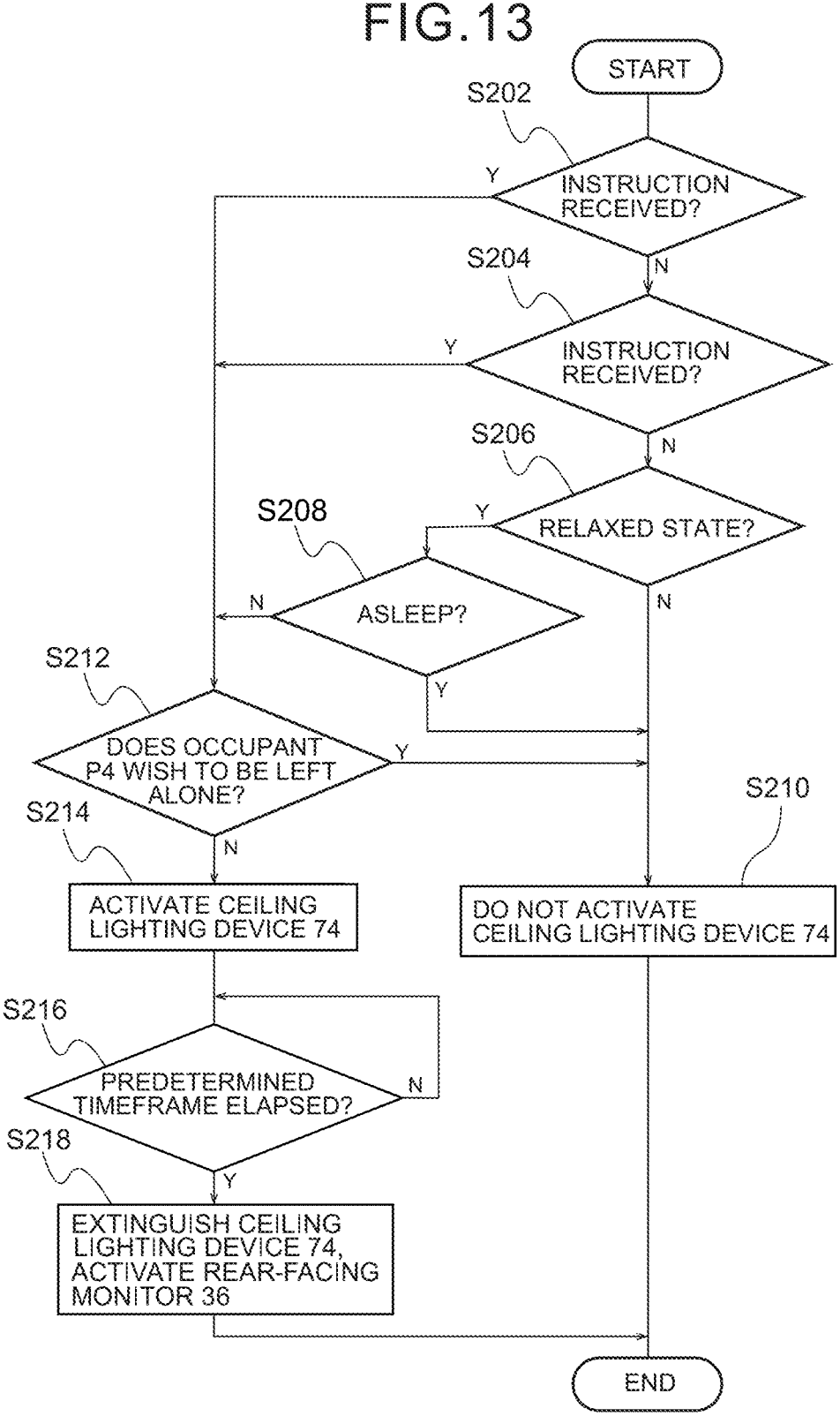
FIG. 13 is a flowchart illustrating an example of a flow of lighting control processing in the second exemplary embodiment.

Explanation follows regarding an example of the lighting control processing to control the ceiling lighting device 74, with reference to the flowchart illustrated in FIG. 13. This lighting control processing is executed by the CPU 40 reading the program from the ROM 42 or the storage 46, and expanding and executing the program in the RAM 44. Note that although in the following explanation an example is described in which the processing is executed for the occupant P3 sitting on the third seat 18, processing would be executed similarly for the occupant P4 sitting on the fourth seat 20.

As illustrated in FIG. 13, at step S202, the CPU 40 determines whether or not an instruction has been received from the occupant P3. Specifically, the CPU 40 uses the functionality of the communication section 60 (see FIG. 12) to determine whether or not an instruction has been received as a result of the occupant P3 operating the portable terminal S3. The instruction referred to here is an instruction indicating that the occupant wishes to engage with the other occupant P4. In cases in which any other instruction has been transmitted, the CPU 40 determines that an instruction has not been received at step S202.

In cases in which the CPU 40 has determined that an instruction indicating that the occupant wishes to engage with the other occupant P4 has been received from the occupant P3 at step S202, processing transitions to step S212. In cases in which the CPU 40 has determined that an instruction indicating that the occupant wishes to engage with the other occupant P4 has not been received from the occupant P3 at step S202, processing transitions to step S204. Note that the processing of step S204 is described first, and the processing of step S212 will be described later.

At step S204, the CPU 40 determines whether or not the occupant P3 has been directing their gaze toward the occupant P4 for a long time. Specifically, the CPU 40 uses the functionality of the occupant state acquisition section 62 (see FIG. 12) to measure the total time for which the occupant P3 has directed their gaze toward the occupant P4 during a predetermined timeframe based on the image data of the occupant P3 captured by the cabin cameras 56. For example, in cases in which the total time for which the occupant P3 has directed their gaze toward the occupant P4 during the predetermined timeframe is greater than a predetermined proportion of the predetermined timeframe, the CPU 40 determines that the occupant P3 has been directing their gaze toward the occupant P4 for a long time.

In cases in which the CPU 40 has determined that the occupant P3 has been directing their gaze toward the occupant P4 for a long time at step S204, processing transitions to step S212. In cases in which the CPU 40 has determined that the occupant P3 has not been directing their gaze toward the occupant P4 for a long time at step S204 (namely for a short time), processing transitions to step S206. The processing of step S206 is described first, and the processing of step S212 will be described later.

At step S206, the CPU 40 determines whether or not the occupant P3 is in a relaxed state. Specifically, the CPU 40 uses the functionality of the occupant state acquisition section 62 (see FIG. 12) to estimate whether the occupant P3 is in a stressed state or in a relaxed state based on the time series data regarding heartrate fluctuations. In cases in which the CPU 40 has determined that the occupant P3 is in a relaxed state, processing transitions to step S208. In cases in which the CPU 40 has determined that the occupant P3 is not in a relaxed state, processing transitions to step S210.

At step S208, the CPU 40 determines whether or not the occupant P3 is asleep. Specifically, the CPU 40 uses the functionality of the occupant state acquisition section 62 (see FIG. 12) to determine that the occupant P3 is asleep in cases in which the eyes of the occupant P3 have been closed for a predetermined timeframe or greater, based on image data captured by the cabin cameras 56. In addition to using the image data captured by the cabin cameras 56, the CPU 40 may also determine that the occupant P3 is asleep in cases in which the alertness level of the occupant P3 is low, based on the heartrate signal for the occupant P3 acquired by the biometric sensors 58.

In cases in which the CPU 40 has determined that the occupant P3 is asleep at step S208, processing transitions to step S210. In cases in which the CPU 40 has determined that the occupant P3 is not asleep at step S208, processing transitions to step S212.

At step S210, the CPU 40 does not activate the ceiling lighting device 74. Namely, the lighting control processing is ended without illuminating the right side illumination unit 74A or the left side illumination unit 74B. Note that in cases in which the ceiling lighting device 74 is already in an activated state, activation of the ceiling lighting device 74 is stopped and then the lighting control processing is ended.

On the other hand, processing transitions to step S212 in cases in which the CPU 40 has determined that an instruction indicating that the occupant P3 wishes to engage with the other occupant P4 has been received from the occupant P3 at step S202, in cases in which the CPU 40 has determined that the occupant P3 has been directing their gaze toward the occupant P4 for a long time at step S204, and also in cases in which the CPU 40 has determined that the occupant P3 is not asleep at step S208.

At step S212, determination is made as to whether or not the occupant P4 wishes to be left alone. Specifically, the CPU 40 uses the functionality of the communication section 60 (see FIG. 12) to determine that the occupant P4 wishes to be left alone in cases in which an instruction indicating that the occupant P4 wishes to be left alone has been received from the occupant P4, and processing transitions to step S210. The CPU 40 also determines that the occupant P4 wishes to be left alone in cases in which the total time for which the occupant P4 has directed their gaze toward the vehicle exterior during a predetermined timeframe is greater than a predetermined proportion of the predetermined timeframe, and processing transitions to step S210.

On the other hand, in cases in which the CPU 40 has not determined that the occupant P4 wishes to be left alone, processing transitions to step S214 and the ceiling lighting device 74 is activated. Thus, the right side illumination unit 74A and the left side illumination unit 74B are illuminated sequentially from the vehicle rear side toward the vehicle front side. When this is performed, after the right side illumination unit 74A and the left side illumination unit 74B have been illuminated as far as their respective front end portions, the right side illumination unit 74A and the left side illumination unit 74B may be illuminated sequentially again from their respective rear end portions. The number of times the right side illumination unit 74A and the left side illumination unit 74B are illuminated and illumination intervals may be adjusted as desired.

At step S216, the CPU 40 determines whether or not a predetermined timeframe has elapsed. Specifically, the CPU 40 measures the time since the ceiling lighting device 74 was initially activated, and in cases in which the predetermined timeframe has elapsed processing transitions to step S218. Note that as an alternative to determining whether or not a predetermined timeframe has elapsed at step S216, determination may be made as to whether or not the light has been moved a predetermined number of times. For example, processing may transition to step S218 in cases in which the number of times that the right side illumination unit 74A and the left side illumination unit 74B have been illuminated sequentially from their respective rear ends to front ends has reached the predetermined number of times.

At step S218, the CPU 40 extinguishes the ceiling lighting device 74. The CPU 40 also activates the rear-facing monitor 36 and displays a video on the rear-facing monitor 36. The CPU 40 then ends the lighting control processing.

As described above, in the vehicle cabin lighting system 70 according to the present exemplary embodiment, the gazes of the occupant P3 and the occupant P4 may be directed naturally toward the vehicle width direction inner side, namely in a direction toward where the other occupant is sitting, enabling a space facilitating communication to be established. This also enables increases in cost and weight to be suppressed in comparison to structures in which a mechanically activated mechanism is employed to redirect the gaze directions of the occupants.

Moreover, in the vehicle cabin lighting system 70 according to the present exemplary embodiment, the right side illumination unit 74A and the left side illumination unit 74B are illuminated sequentially from the vehicle rear side toward the vehicle front side in cases in which the occupant has been determined to have an interest in interacting with the other occupant inside the vehicle cabin. As illustrated in FIG. 9, to the human eye, the width between the left and right illumination units appears to narrow on progression away from the vantage point. The occupant P3 and the occupant P4 therefore follow the light with their eyes during the sequential illumination from the vehicle rear side toward the vehicle front side, enabling their gaze directions to be directed toward the vehicle width direction inner side. This enables the gaze directions of the occupants to be redirected using a simple structure.

In the vehicle cabin lighting system 70 according to the present exemplary embodiment, a video is displayed on the rear-facing monitor 36, thus enabling the gazes of the occupant P3 and the occupant P4 to be suppressed from wandering after being directed toward the vehicle width direction inner side. This enables attention to be more effectively directed toward the other occupant.

Third Exemplary Embodiment

Figure 14:
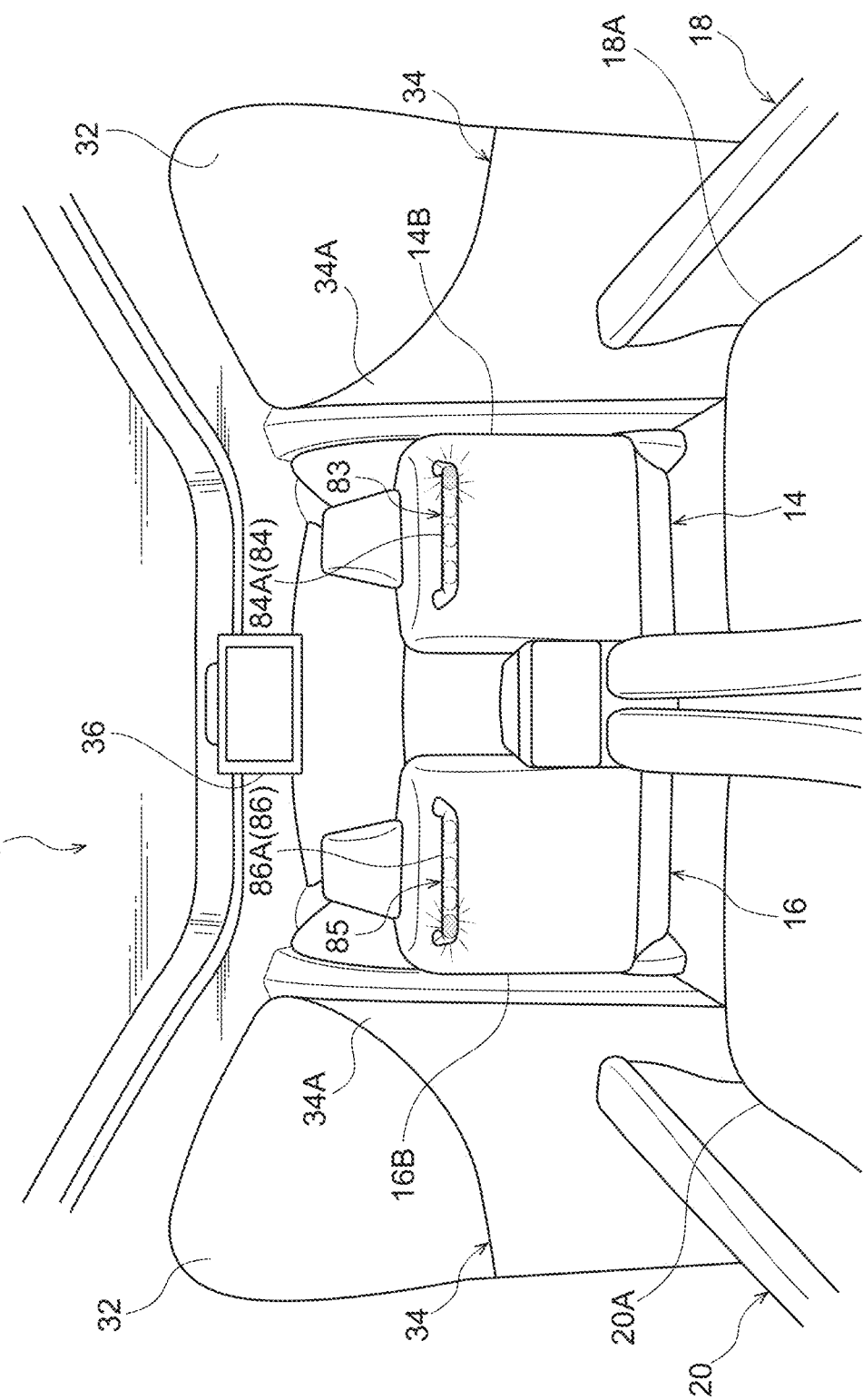
FIG. 14 is a diagram of a vehicle cabin inside of a vehicle of a third exemplary embodiment as viewed from a vehicle rear side, illustrating a state in which light is being moved.
Figure 15:
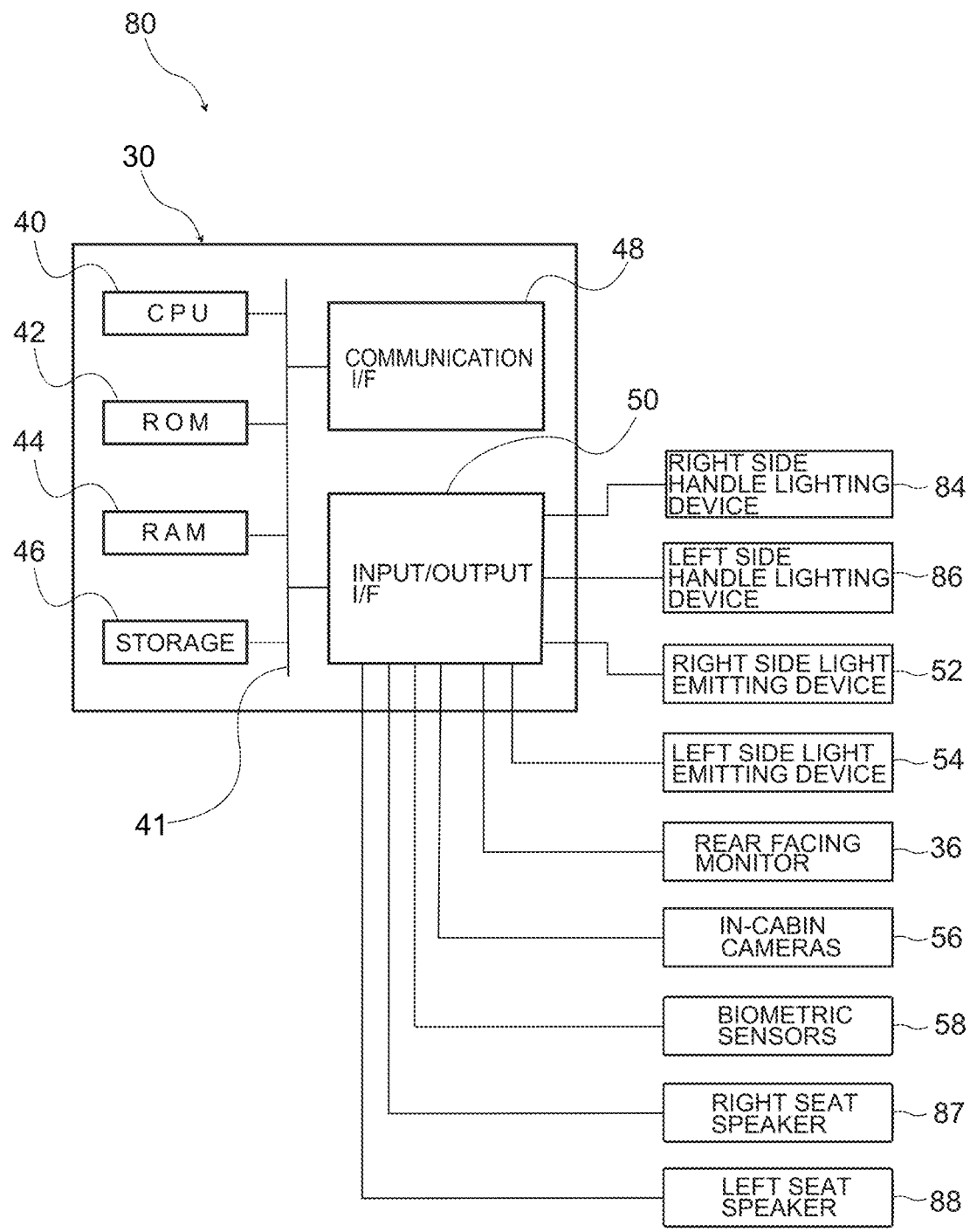
FIG. 15 is a block diagram illustrating a hardware configuration of a vehicle cabin lighting system according to the third exemplary embodiment.
Figure 16:
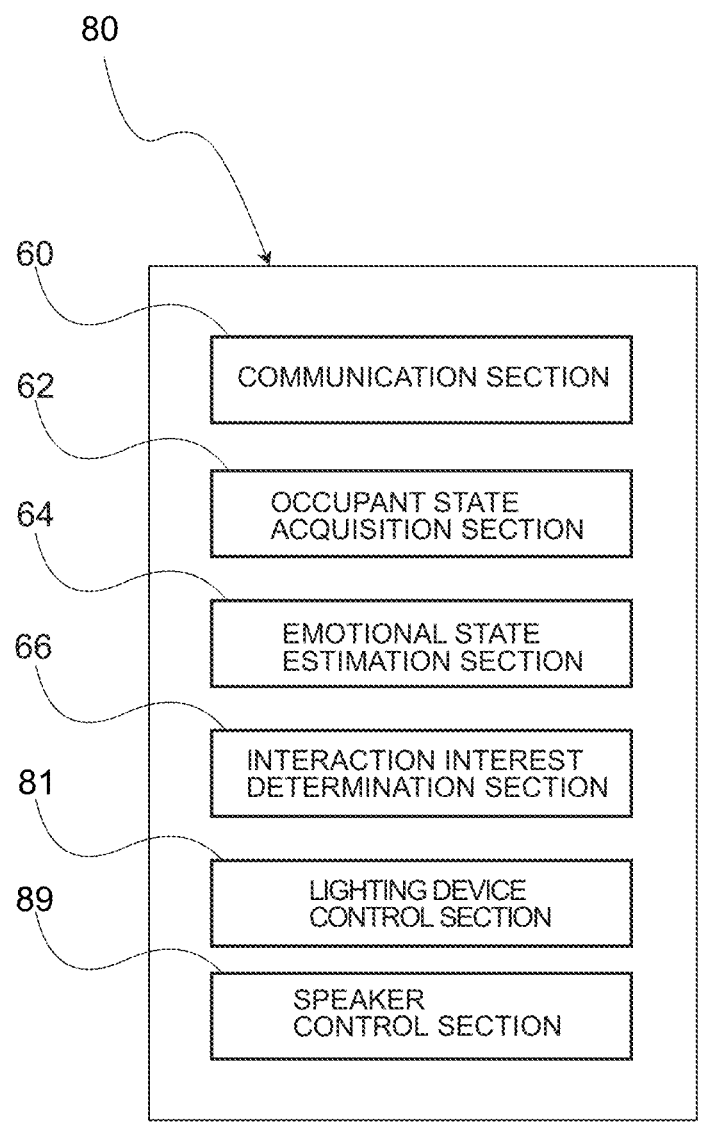
FIG. 16 is a block diagram illustrating functional configuration of a vehicle cabin lighting system according to the third exemplary embodiment.

Next, explanation follows regarding a vehicle cabin lighting system 80 according to a third exemplary embodiment of the present disclosure, with reference to FIG. 14 to FIG. 16. Note that configurations similar to those of the first exemplary embodiment are allocated the same reference numerals, and explanation thereof is omitted where appropriate.

As illustrated in FIG. 14, a vehicle 82 applied with the vehicle cabin lighting system 80 according to the present exemplary embodiment includes a grip handle 83 provided on the back face of the seatback 14B of the first seat 14. A grip handle 85 is also provided on the back face of the seatback 16B of the second seat 16. The grip handle 83 and the grip handle 85 are configured so as to be illuminated.

Specifically, the grip handle 83 is provided with a right side handle lighting device 84, and the right side handle lighting device 84 includes an illumination unit 84A disposed running along the grip handle 83. Plural light sources are arrayed along the vehicle width direction in the illumination unit 84A, and the illumination unit 84A is configured to be illuminated sequentially from the left side toward the right side. A light accordingly moves from the vehicle width direction inner side toward the vehicle width direction outer side.

A left side handle lighting device 86 is provided inside the grip handle 85, and the left side handle lighting device 86 includes an illumination unit 86A disposed running along the grip handle 85. Plural light sources are arrayed in the illumination unit 86A along the vehicle width direction, and the illumination unit 86A is configured to be illuminated sequentially from the right side toward the left side. A light accordingly moves from the vehicle width direction inner side toward the vehicle width direction outer side.

Hardware Configuration of Vehicle Cabin Lighting System 80

FIG. 15 is a block diagram illustrating a hardware configuration of the vehicle cabin lighting system 80. As illustrated in FIG. 15, an ECU 30 of the vehicle cabin lighting system 80 is configured including a CPU 40, ROM 42, RAM 44, storage 46, a communication interface 48, and an input/output interface 50.

The right side handle lighting device 84, the left side handle lighting device 86, the right side light emitting device 52, the left side light emitting device 54, the rear-facing monitor 36, the cabin cameras 56, the biometric sensors 58, the right seat speaker 87, and the left seat speaker 88 are each connected to the input/output interface 50.

Functional Configuration of Vehicle Cabin Lighting System 80

Various functionality of the vehicle cabin lighting system 80 is implemented using the hardware resources described above. Explanation follows regarding functional configurations implemented by the vehicle cabin lighting system 80, with reference to FIG. 16.

As illustrated in FIG. 16, the functional configuration of the vehicle cabin lighting system 80 includes a communication section 60, an occupant state acquisition section 62, an emotional state estimation section 64, an interaction interest determination section 66, a lighting device control section 81, and a speaker control section 89. Note that this functional configuration is implemented by the CPU 40 reading and executing a program stored in the ROM 42 or the storage 46.

The communication section 60 exchanges data with an external server and other devices through the communication interface 48. For example, the communication section 60 exchanges data with the portable terminals S3, S4 in the possession of the occupants sitting on the various vehicle seats.

The occupant state acquisition section 62 acquires states of the occupants sitting on the third seat 18, the fourth seat 20, and the fifth seat 22. The emotional state estimation section 64 estimates the emotional states of the occupant P3 and the occupant P4 sifting on the third seat 18, the fourth seat 20, and the fifth seat 22. The interaction interest determination section 66 determines whether or not the occupant P3 and the occupant P4 sitting on the third seat 18, the fourth seat 20, and the fifth seat 22 each has an interest in interacting with another occupant inside the vehicle cabin.

In cases in which the occupant P3 has been determined not to have an interest in interacting with the other occupant P4 by the functionality of the interaction interest determination section 66, the lighting device control section 81 controls the right side handle lighting device 84 so as to move the position of the light in order to direct the gaze direction of the occupant P3 toward the vehicle width direction outer side. Specifically, the lighting device control section 81 illuminates the illumination unit 84A of the right side handle lighting device 84 sequentially from the left side toward the right side as illustrated in FIG. 14.

After illuminating the illumination unit 84A, or while the illumination unit 84A is illuminated, the lighting device control section 81 also activates the right side light emitting device 52 such that at least one out of the pillar garnish 28 or the door garnish 34A emits light.

On the other hand, in cases in which the occupant P4 has been determined not to have an interest in interacting with the other occupant P3 by the functionality of the interaction interest determination section 66, the lighting device control section 81 controls the left side handle lighting device 86 so as to move the position of the light in order to direct the gaze direction of the occupant P4 toward the vehicle width direction outer side. Specifically, the lighting device control section 81 illuminates the illumination unit 86A of the left side handle lighting device 86 sequentially from the right side toward the left side as illustrated in FIG. 14.

After illuminating the illumination unit 86A, or while the illumination unit 86A is illuminated, the lighting device control section 81 also activates the left side light emitting device 54 such that at least one out of the pillar garnish 28 or the door garnish 34A emits light.

As illustrated in FIG. 16, the speaker control section 89 controls the right seat speaker 87 built into the headrest 18C of the third seat 18 and the left seat speaker 88 built into the headrest 20C of the fourth seat 20 illustrated in FIG. 1. Specifically, in cases in which the occupant P3 has been determined not to have an interest in interacting with the other occupant P4 by the functionality of the interaction interest determination section 66, the speaker control section 89 outputs a sound from the right seat speaker 87 at a louder volume on the seat right side (the vehicle width direction outer side) than on the seat left side (the vehicle width direction inner side).

On the other hand, in cases in which the occupant P4 has been determined not to have an interest in interacting with the other occupant P3 by the functionality of the interaction interest determination section 66, the speaker control section 89 outputs a sound from the left seat speaker 88 at a louder volume on the seat left side than on the seat right side. Note that the timing at which the speaker control section 89 outputs the sound may be at the same timing as activation of the right side handle lighting device 84 or the left side handle lighting device 86, or may be after activation of the right side handle lighting device 84 or the left side handle lighting device 86.

Operation

Next, explanation follows regarding operation of the present exemplary embodiment.

As described above, in the vehicle cabin lighting system 80 according to the present exemplary embodiment, in cases in which the occupant P3 has been determined not to have an interest in interacting with the other occupant P4 inside the vehicle cabin, the illumination unit 84A inside the grip handle 83 provided on the back face of the seatback 14B is illuminated sequentially from the vehicle width direction inner side toward the vehicle width direction outer side. The occupant P3 follows the light that is illuminated sequentially with their eyes, enabling their gaze direction to be directed toward the vehicle width direction outer side. Similarly, in cases in which the occupant P4 has been determined not to have an interest in interacting with the other occupant P3 inside the vehicle cabin, the illumination unit 86A inside the grip handle 85 provided on the back face of the seatback 16B is illuminated sequentially from the vehicle width direction inner side toward the vehicle width direction outer side. The occupant P4 follows the light that is illuminated sequentially with their eyes, enabling their gaze direction to be directed toward the vehicle width direction outer side.

Moreover, in the vehicle cabin lighting system 80 according to the present exemplary embodiment, in cases in which the occupant P3 has been determined not to have an interest in interacting with the other occupant P4, the right seat speaker 87 is controlled so as to have a louder volume on the vehicle width direction outer side. This enables the gaze direction of the occupant P3 to be directed naturally toward the vehicle width direction outer side where the volume is louder. Similarly, in cases in which the occupant P4 has been determined not to have an interest in interacting with the other occupant P3, the left seat speaker 88 is controlled so as to have a louder volume on the vehicle width direction outer side. This enables the gaze direction of the occupant P4 to be directed naturally toward the vehicle width direction outer side where the volume is louder. This enables the gaze directions of the occupants to be redirected more effectively than in configurations in which the gaze directions of the occupants are redirected using movement of light alone.

Moreover, in the vehicle cabin lighting system 80 according to the present exemplary embodiment, since the grip handle 83 and the grip handle 85 may be illuminated, this may be utilized for purposes other than moving the gaze of an occupant. For example, illuminating the grip handle 83 or the grip handle 85 when an occupant alights from the vehicle may encourage the occupant to grip the grip handle 83 or the grip handle 85, thereby enabling the occupant to alight safely.

Fourth Exemplary Embodiment

Next, explanation follows regarding a vehicle cabin lighting system 90 according to a fourth exemplary embodiment of the present disclosure, with reference to FIG. 17A to FIG. 17C. Note that configurations similar to those of the first exemplary embodiment are allocated the same reference numerals, and explanation thereof is omitted where appropriate.

As illustrated in FIG. 17A, a vehicle 92 applied with the vehicle cabin lighting system 90 according to the present exemplary embodiment includes a lighting device 94 that causes the right side door garnish 34A to emit light. The lighting device 94 is configured including an illumination unit 94A disposed running along the vehicle front-rear direction at the vehicle width direction outer side of the door garnish 34A.

The illumination unit 94A is arrayed along the vehicle front-rear direction at the vehicle width direction outer side of the door garnish 34A. Note that the door garnish 34A is formed with a shape that becomes shorter in the vehicle vertical direction on progression from the vehicle front side toward the vehicle rear side, such that the front side of the illumination unit 94A is longer in the vehicle vertical direction than the rear side of the illumination unit 94A.

In cases in which the occupant P3 has been determined not to have an interest in interacting with the other occupant P4, the vehicle cabin lighting system 90 of the present exemplary embodiment controls the lighting device 94 so as to move a position of light in order to direct the gaze direction of the occupant P3 toward the vehicle width direction outer side. Specifically, as illustrated in FIG. 17A, FIG. 17B, and FIG. 17C, the illumination unit 94A is illuminated sequentially from the vehicle front side toward the vehicle rear side. A light-emitting surface area of the door garnish 34A accordingly becomes progressively smaller.

Operation

Next, explanation follows regarding operation of the present exemplary embodiment.

As described above, in cases in which the occupant P3 has been determined not to have an interest in interacting with the other occupant P4, the vehicle cabin lighting system 90 according to the present exemplary embodiment controls the lighting device 94 such that the illumination unit 94A is illuminated sequentially from the vehicle front side toward the vehicle rear side. The occupant P3 therefore follows the light with their eyes during the sequential illumination from the vehicle front side toward the vehicle rear side, enabling their gaze direction to be directed toward the vehicle width direction outer side. Accordingly, the other occupant inside the vehicle cabin does not readily enter the field of vision of the occupant P3. In particular, since the door garnish 34A is positioned at gaze height at the vehicle width direction outer side of the occupant P3, the door garnish 34A may readily capture the attention of the occupant P3. As a result, the gaze direction of the occupant P3 may be redirected toward the vehicle width direction outer side without the occupant P3 changing their gaze height.

The door garnish 34A of the present exemplary embodiment is formed with a shape that becomes shorter in the vehicle vertical direction on progression from the vehicle front side toward the vehicle rear side. Accordingly, by illuminating the illumination unit 94A disposed running along the vehicle front-rear direction at the vehicle width direction outer side of the door garnish 34A sequentially from the vehicle front side toward the vehicle rear side, the light-emitting surface area of the door garnish 34A becomes progressively smaller. Note that in general, people have a tendency to move their gaze from larger objects to smaller objects. Accordingly, the gaze direction of the occupant may be directed toward the vehicle width direction outer side due to the occupant P3 following the light of the door garnish 34A with their eyes as it becomes progressively smaller. Namely, the gaze direction of the occupant P3 may be redirected more effectively than in configurations in which a light is moved while remaining the same size.

Note that although explanation has been given regarding a configuration in which the lighting device 94 is provided to the door garnish 34A on the vehicle right side in the present exemplary embodiment, there is no limitation thereto, and a similar lighting device may also be provided on the vehicle left side.

Although explanation has been given regarding the vehicle cabin lighting systems 10, 70, 80, 90 according to the first exemplary embodiment to the fourth exemplary embodiment, obviously various modifications may be implemented within a range not departing from the spirit of the present disclosure. For example, the first exemplary embodiment and the second exemplary embodiment may be combined. In such cases, providing the ceiling lighting device 74 to the ceiling inside the vehicle 12 illustrated in FIG. 2 enables spaces to be established both in cases in which the occupant P3 and the occupant P4 wish to be left alone, and in cases in which the occupant P3 and the occupant P4 wish to pass the time in each other's company.

Moreover, in the vehicle cabin lighting systems 10, 70, 80, 90 of the first exemplary embodiment to the fourth exemplary embodiment described above, the present disclosure is applied to a vehicle with three rows of seats as an example. However, there is no limitation thereto. Namely, such vehicle cabin lighting systems may also be applied to vehicles with two rows of seats. Likewise, such vehicle cabin lighting systems may also be applied to a vehicle such as a bus in which four or more rows of vehicle seats are arranged along the vehicle front-rear direction.

Moreover, in the vehicle cabin lighting systems 10, 70, 80, 90 of the first exemplary embodiment to the fourth exemplary embodiment described above, the interaction interest determination section 66 determines an interest in interacting with another occupant based on signals from the occupant state acquisition section 62 and the emotional state estimation section 64. However, there is no limitation thereto. For example, interest in interacting with another occupant may be determined based on signals from either one out of the occupant state acquisition section 62 or the emotional state estimation section 64. Alternatively, in addition to the occupant state acquisition section 62 and the emotional state estimation section 64, interest in interacting with another occupant may also be determined based on other conditions. For example, directional microphones may be provided to pick up the voices of occupants P1 to P4 inside the vehicle cabin of the vehicle 12, 72, and interest in interacting with another occupant may be determined based on signals acquired by these microphones. Specifically, the voice of the occupant P3 may be picked up by such a microphone when the occupant P3 starts speaking to the occupant P4, and the interaction interest determination section 66 may determine that the occupant P3 has an interest in interacting with the other occupant P4 based on the signal acquired by this microphone.

Moreover, in the vehicle cabin lighting system 10 of the first exemplary embodiment, the lighting device control section 68 initially shines light from the right side cabin lamp 38 and the left side cabin lamp 39 onto the leading end portion of the armrest 18D and the leading end portion of the armrest 20D as illustrated in FIG. 2. However, there is no limitation thereto. For example, light may be shone onto a rear face of the center console 24.

Moreover, in the vehicle cabin lighting system 70 of the second exemplary embodiment described above, as illustrated in FIG. 9, the front end portion of the right side illumination unit 74A is curved toward the vehicle width direction inner side, and the front end portion of the left side illumination unit 74B is also curved toward the vehicle width direction inner side. However, there is no limitation thereto. Namely, the right side illumination unit 74A may be formed in a substantially linear shape along the vehicle front-rear direction, and not include a portion extending in the vehicle width direction. Similarly, the left side illumination unit 74B may be formed in a substantially linear shape along the vehicle front-rear direction, and not include a portion extending in the vehicle width direction. In such cases, since to the human eye the width between the left and right illumination units appears to narrow on progression away from the vantage point, the gaze direction of the occupant may be directed toward the vehicle width direction inner side since the occupant follows the lights that are illuminated sequentially from the vehicle rear side toward the vehicle front side with their eyes.

Moreover, as illustrated in FIG. 14, in the vehicle cabin lighting system 80 of the third exemplary embodiment described above, the right side handle lighting device 84 is provided inside the grip handle 83, and the left side handle lighting device 86 is provided inside the grip handle 85. However, there is no limitation thereto. For example, in cases in which the grip handle 83 is not provided to the first seat 14, an illumination unit of a lighting device may be embedded in the back face of the seatback 14B of the first seat 14. In such cases too, illuminating the illumination unit disposed running along the vehicle width direction sequentially from the vehicle width direction inner side toward the vehicle width direction outer side enables the gaze of the occupant P3 to be directed toward the vehicle width direction outer side.

The lighting control processing executed by the CPU 40 reading software (a program) in the exemplary embodiments described above may be executed by various types of processor other than the CPU 40. Such processors include programmable logic devices (PLDs) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The lighting control processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Although various data is stored in the storage 46 in the exemplary embodiments described above, there is no limitation thereto. For example, a storage section may be configured by a non-transitory recording medium such as a compact disc (CD), digital versatile disc (DVD), or universal serial bus (USB) memory. In such cases, various programs, data, and the like are held on the recording medium.

What is claimed is:

1. A vehicle cabin lighting system comprising:
   a lighting device that is provided inside a vehicle cabin and that is configured to move a position of light; and
   a control section that is configured to determine whether or not an occupant sitting on a vehicle seat has an interest in interacting with another occupant inside the vehicle cabin based on operation of an operation section by the occupant or based on a state of the occupant sitting on the vehicle seat, and to control the lighting device so as to move the position of the light in order to direct a gaze direction of the occupant toward a vehicle width direction outer side in a case in which no interest in interacting has been determined.

2. The vehicle cabin lighting system of claim 1, wherein the lighting device includes an cabin lamp disposed on a ceiling inside the vehicle cabin and is configured to change an irradiation direction.

3. The vehicle cabin lighting system of claim 1, wherein:
   the lighting device is configured including an illumination unit disposed along a vehicle width direction in a back face of a seatback of a front seat; and
   the control section is configured to illuminate the illumination unit sequentially from a vehicle width direction inner side toward the vehicle width direction outer side in a case in which the occupant has been determined not to have an interest in interacting with the other occupant inside the vehicle cabin.

4. The vehicle cabin lighting system of claim 3, further comprising:
   a light emitting device provided to cause at least one of a pillar garnish or a door garnish to emit light,
   wherein the control section is configured to activate the light emitting device either after the illumination unit is illuminated or while the illumination unit is illuminated so as to cause the at least one of the pillar garnish or the door garnish to emit light.

5. The vehicle cabin lighting system of claim 1, further comprising:
   a speaker configured to output sound at different volumes to a left and a right of the occupant sitting on the vehicle seat,
   wherein the control section is configured to output sound from the speaker at a louder volume at the vehicle width direction outer side than at a vehicle width direction inner side in a case in which the occupant has been determined not to have an interest in interacting with the other occupant inside the vehicle cabin.

6. The vehicle cabin lighting system of claim 1, wherein:
   the lighting device includes an illumination unit disposed along a vehicle front-rear direction at a vehicle width direction outer side of a door garnish; and
   the control section is configured to illuminate the illumination unit sequentially from a vehicle front side toward a vehicle rear side in a case in which the occupant has been determined not to have an interest in interacting with the other occupant inside the vehicle cabin.

7. The vehicle cabin lighting system of claim 6, wherein:
   the door garnish is formed with a shape that becomes shorter in a vehicle vertical direction on progression from the vehicle front side toward the vehicle rear side; and
   the illumination unit is illuminated sequentially from the vehicle front side toward the vehicle rear side such that a light-emitting surface area of the door garnish becomes progressively smaller.

8. A vehicle cabin lighting system comprising:
   a lighting device that is provided inside a vehicle cabin and that is configured to move a position of light; and
   a control section that is configured to determine whether or not an occupant sitting on a vehicle seat has an interest in interacting with another occupant inside the vehicle cabin based on operation of an operation section by the occupant or based on a state of the occupant sitting on the vehicle seat, and to control the lighting device so as to move the position of the light in order to direct a gaze direction of the occupant toward a vehicle width direction inner side in a case in which an interest in interacting has been determined.

9. The vehicle cabin lighting system of claim 8, wherein the lighting device includes an cabin lamp disposed on a ceiling inside the vehicle cabin and is configured to change an irradiation direction.

10. The vehicle cabin lighting system of claim 8, wherein:
the lighting device includes an illumination unit disposed along a vehicle front-rear direction at both vehicle width direction end portions of a ceiling inside the vehicle cabin; and
the control section is configured to illuminate the illumination unit sequentially from a vehicle rear side toward a vehicle front side in a case in which the occupant has been determined to have an interest in interacting with the other occupant inside the vehicle cabin.

11. The vehicle cabin lighting system of claim 10, further comprising:
a rear-facing monitor provided at a vehicle width direction central portion of the ceiling inside the vehicle cabin,
wherein the control section is configured to display a video on the rear-facing monitor after the illumination unit is illuminated or while the illumination unit is illuminated.

12. A vehicle cabin lighting system comprising:
a lighting device that is provided inside a vehicle cabin and that is configured to move a position of light; and
a processor being configured to:
determine whether or not an occupant sitting on a vehicle seat has an interest in interacting with another occupant inside the vehicle cabin based on operation of an operation section by the occupant or based on a state of the occupant sitting on the vehicle seat;
control the lighting device so as to move the position of the light in order to direct a gaze direction of the occupant toward a vehicle width direction inner side in a case in which an interest in interacting has been determined; and
control the lighting device so as to move the position of the light in order to direct the gaze direction of the occupant toward a vehicle width direction outer side in a case in which no interest in interacting has been determined.

\* \* \* \* \*